(12) United States Patent
Ushigome

(10) Patent No.: US 7,562,984 B2
(45) Date of Patent: Jul. 21, 2009

(54) POLARIZING BEAM SPLITTER AND PROJECTION APPARATUS HAVING THE SAME

(75) Inventor: Reona Ushigome, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 601 days.

(21) Appl. No.: 11/201,050

(22) Filed: Aug. 9, 2005

(65) Prior Publication Data

US 2006/0044514 A1   Mar. 2, 2006

(30) Foreign Application Priority Data

Aug. 9, 2004   (JP)   ............................. 2004-232125

(51) Int. Cl.
*G03B 21/14*   (2006.01)
*G02B 5/30*   (2006.01)
*G02B 27/28*   (2006.01)

(52) U.S. Cl. ......................... 353/20; 359/487; 359/495; 359/638

(58) Field of Classification Search .................... 353/20; 359/487, 488, 495, 583, 634, 636, 638, 639
See application file for complete search history.

(56) References Cited

U.S. PATENT DOCUMENTS

| | | | |
|---|---|---|---|
| 5,453,859 A * | 9/1995 | Sannohe et al. ................. | 349/9 |
| 5,658,490 A | 8/1997 | Sharp et al. | |
| 5,751,384 A | 5/1998 | Sharp | |
| 5,822,021 A | 10/1998 | Johnson et al. | |
| 5,825,849 A | 10/1998 | Garland et al. | |
| 5,929,946 A | 7/1999 | Sharp et al. | |
| 5,953,083 A | 9/1999 | Sharp | |
| 5,990,996 A | 11/1999 | Sharp | |
| 5,999,240 A | 12/1999 | Sharp et al. | |
| 6,046,786 A | 4/2000 | Sharp et al. | |
| 6,049,367 A | 4/2000 | Sharp et al. | |
| 6,078,374 A | 6/2000 | Sharp et al. | |
| 6,183,091 B1 | 2/2001 | Johnson et al. | |

(Continued)

FOREIGN PATENT DOCUMENTS

JP   11-504441   4/1999

(Continued)

OTHER PUBLICATIONS

Li Li and J. A. Dobrowolski, "High-performance thin-film polarizing beam splitter operating at angles greater than the critical angle", Applied Optical, vol. 39, pp. 2754-2771, Jun. 1, 2000.

*Primary Examiner*—Rochelle-Ann J Blackman
(74) *Attorney, Agent, or Firm*—Morgan & Finnegan, LLP

(57) ABSTRACT

A polarizing beam splitter comprising a multilayer film formed by alternately laminating a plurality of H layers and a plurality of L layers having a relatively lower refractive index than a refractive index of the H layers, wherein transmittance of s-polarized light is higher than that of p-polarized light by 60% or higher of the transmittance of the p-polarized light in a first wavelength band having a bandwidth equal to or larger than 30 nm in a visible region, and transmittance of p-polarized light is higher than that of s-polarized light by 60% or higher of the transmittance of the s-polarized light in a second wavelength band different from the first wavelength band in the visible region.

17 Claims, 17 Drawing Sheets

U.S. PATENT DOCUMENTS

| | | |
|---|---|---|
| 6,252,638 B1 | 6/2001 | Johnson et al. |
| 6,273,571 B1 | 8/2001 | Sharp et al. |
| 6,310,673 B1 | 10/2001 | Sharp |
| 6,310,729 B1 * | 10/2001 | Tsukamoto ............... 359/634 |
| 6,380,997 B1 | 4/2002 | Sharp et al. |
| 6,417,892 B1 | 7/2002 | Sharp et al. |
| 6,452,646 B1 | 9/2002 | Sharp et al. |
| 7,258,445 B2 * | 8/2007 | Okuyama ............... 353/20 |
| 7,379,242 B2 * | 5/2008 | Ushigome ............... 359/487 |

FOREIGN PATENT DOCUMENTS

| | | |
|---|---|---|
| JP | 11-153774 | 6/1999 |

* cited by examiner

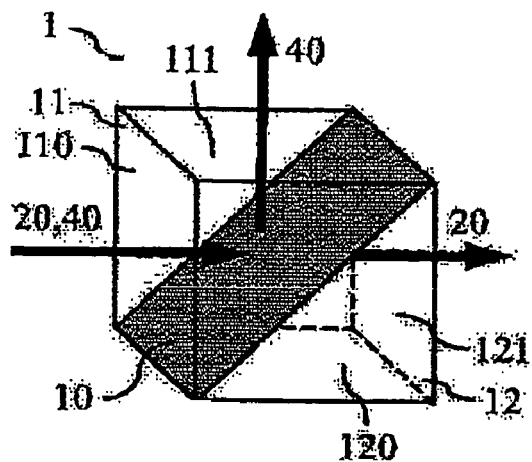
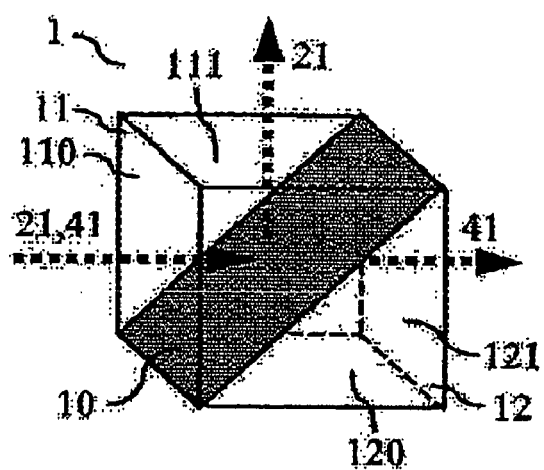
FIG. 1A  FIG. 1B
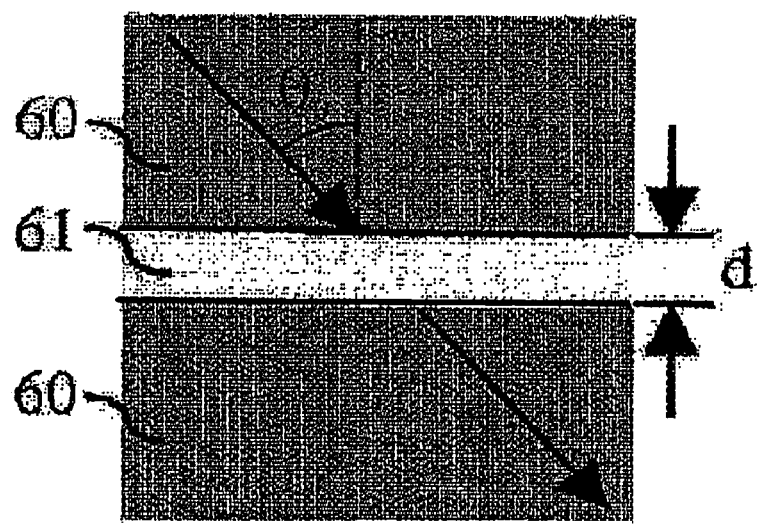
FIG. 2

POLARIZING BEAM SPLITTER AND PROJECTION APPARATUS HAVING THE SAME

BACKGROUND OF THE INVENTION

The present invention relates to a polarizing beam splitter and a projection apparatus having the same. The present invention relates to a polarizing beam splitter with wavelength selectivity which transmits s-polarized light in a first wavelength band and reflects the s-polarized light in a second wavelength band different from the first wavelength band, and reflects p-polarized light in the first wavelength band and transmits the p-polarized light in the second wavelength band, by way of example. The present invention is particularly preferable for a projection apparatus which employs a reflection-type light modulator with liquid crystal.

A conventionally well-known polarizing beam splitter is a polarizing beam splitter (PBS) of a prism type in which polarization splitting is achieved by a dielectric thin film comprised of a number of alternately laminated H layers and L layers between two prisms. Each H layer is formed of a dielectric thin film with high refractive index and each L layer is formed of a dielectric thin film with low refractive index.

The dielectric thin film has the optical characteristic of transmitting p-polarized light and reflecting s-polarized light incident thereon. The principles of the polarizing beam splitter are that, for p-polarized light, the incident angle generally matches the Brewster angle θB that satisfies the following expression 1 expressed by the relationship of the refractive index $n_P$ of the material of the prism, the refractive index $n_H$ of the H layer, and the refractive index $n_L$ of the L layer, thereby transmitting the p-polarized light.

$$\sin^2\theta_B = \frac{n_H^2 n_L^2}{n_P^2(n_H^2 + n_L^2)} \quad (1)$$

For s-polarized light, the reflection at the interface between the H layer and the L layer is used to reflect the s-polarized light through multilayer film interaction. The characteristic of the PBS is degraded when it is used out of design conditions due to variations in factors because of a change in incident angle or wavelength for use.

In particular, the conditions for the Brewster angle are sensitive to each constant, so that the p-polarized light is more likely to be affected than the s-polarized light. In an optical system for use in an image projection apparatus (a projection apparatus), luminous flux radiated from a light source often has a certain angular range, and a wavelength range as wide as the whole range of visual light is used. In general, the number of the layers in the polarization splitting film is added or the thickness of the film is modified to provide favorable characteristics in an intended angular range and wavelength band.

A PBS which reflects p-polarized light and transmits s-polarized light has been reported in "Li Li and J. A. Dobrowolski, Appl. Opt., vol. 39, p. 2754, 2000". The incident angle is set to an angle equal to or larger than the critical angle of a prism with high refractive index (a prism made of a material with high refractive index) and a thin film with low refractive index (a thin film made of a material with low refractive index) to produce attenuated total reflection. Since the light after attenuated total reflection has its phase changed, the principles of transmitting p-polarized light and reflecting s-polarized light through interference in a provided multilayer film are used to realize the PBS. This achieves favorable characteristics in a wide range of incident angles.

On the other hand, a dichroic mirror is also well-known which has a dielectric thin film comprised of alternately laminated H layers each formed of a dielectric thin film with high refractive index and L layers each formed of a dielectric thin film with low refractive index.

The dichroic mirror also has the optical characteristic of utilizing interference in the multilayer film through reflection at the interface between the H layer and the L layer to transmit or reflect light in a specific wavelength band.

The dichroic mirror is generally used with a grazing incidence, and separates a transmitted light and a reflected light on a border of a particular wavelength band. A variety of film structures are known which realize the functions of a high pass filter, a low pass filter, a band pass filter or the like. In particular, to separate the wavelength bands for red, green, and blue from each other, it is possible to use a long wavelength transmission filter, a wavelength band pass filter, a short wavelength transmission filter or the like.

The characteristic of the dichroic mirror is degraded when the incident angle and polarization conditions are out of design conditions. When the incident angle is changed, the optical admittance of the thin film material is changed to widen the transmission band of p-polarized light (or narrow the reflection band) and narrow the transmission band of s-polarized light (or widen the reflection band). As a result, the transition wavelengths at the shift from the transmission band to the reflection band are changed in opposite directions in the p-polarized light and s-polarized light.

Thus, design is typically made such that the number of the layers in the polarization splitting film is added or the thickness of the film is modified to widen the angular range for use and reduce the polarization dependence in p-polarized light and s-polarized light.

The PBS or dichroic mirror is used to form a color separation/combination optical system (a color separation/color combination means) of an image projection apparatus.

FIG. 19 shows an example of a conventional image projection apparatus which employs a light modulator of a reflection type realized with liquid crystal.

Arrows represent the optical paths of light beams for red, green, and blue in white display (image information is for white color). Solid lines represent s-polarized light, while broken lines represent p-polarized light.

White light emits from a light source 51, and unified into s-polarized light by a polarization changer 52. A dichroic mirror 53a transmits a light beam 30 in a green wavelength band, and reflects a light beam 40 in a red wavelength band and a light beam 20 in a blue wavelength band.

The light beam 30 in the green wavelength band transmitted through the dichroic mirror 53a is reflected by a PBS 54a, incident on a reflection type light modulator 55g realized with liquid crystal for green, and modulated. For the white display, the modulated light emerges therefrom as p-polarized light 31 which is then transmitted through the PBS 54a and a PBS 54c and is incident on a projection lens system (a projection optical system) 57 for projection.

The light beam 20 in the blue wavelength band reflected by the dichroic mirror 53a is changed into p-polarized light 21 by a wavelength selective phase shifter 56b, transmitted through a PBS 54b, and incident on a reflection type light modulator 55b realized with liquid crystal for blue and then modulated.

For the white display, the modulated light emerges therefrom as s-polarized light 20, so that it is reflected by the PBS 54b and maintained as the s-polarized light 20 through a wavelength selective phase shifter 56r. It is then reflected by the PBS 54c and is incident on the projection lens system 57 for projection.

The light beam 40 in the red wavelength band reflected by the dichroic mirror 53a is maintained as the s-polarized light 40 through the wavelength selective phase shifter 56b, reflected by the PBS 54b, and incident on a reflection type light modulator 55r realized with liquid crystal for red, and then modulated.

For the white display, since the modulated light emerges therefrom as p-polarized light 41, it is transmitted through the PBS 54b, changed into s-polarized light 40 through the wavelength selective phase shifter 56r, reflected by the PBS 54c, and incident on the projection lens system 57 for projection.

For black display (image information is for black color), all of the light beams emerge from the reflection type light modulators 55r, 55g, or 55b with the same polarization as when they are incident thereon, so that they return toward the light source 51 along the same optical paths through the respective optical members. The color separation/combination means as described above is used to take advantage of the reflection type light modulator realized with the liquid crystal with high resolution and to form a small apparatus.

The conventional PBS aims to transmit p-polarized light and reflect s-polarized light throughout the wavelength band for use. The PBS described in Document 1 reflects p-polarized light and transmits s-polarized light. All of the PBSs are devices for providing polarization splitting throughout the wavelength band for use. None of the previously reported PBSs has wavelength selectivity or has polarization splitting characteristics reversed in different wavelength bands such that it transmits s-polarized light and reflects p-polarized light in a first wavelength band and reflects s-polarized light and transmits p-polarized light in a second wavelength band different from the first wavelength band.

In the dichroic mirror, the transmission band of p-polarized light is widened and the transmission band of s-polarized light is narrowed when light is obliquely incident thereon, so that polarization splitting is performed in a certain wavelength band. However, p-polarized light is transmitted and s-polarized light is reflected at all times, and p-polarized light is not reflected and s-polarized light is not transmitted. Thus, it does not have the characteristic depending on wavelength such that it transmits s-polarized light and reflects p-polarized light in a first wavelength band and reflects s-polarized light and transmits p-polarized light in a second wavelength band different from the first wavelength band.

The color separation/combination in the image projection apparatus shown in FIG. 19 requires the two wavelength selective phase shifters 56b and 56r. Each of the wavelength selective phase shifters 56b and 56r is comprised of a plurality of laminated stretched polycarbonate films with birefringence such that their anisotropy axes are arranged at particular angles, as described in Japanese Patent Laid-Open 11-504441. It involves a more complicated fabricating method and thus is an expensive optical device as compared with the PBS or dichroic mirror formed with the dielectric thin film using a deposition method.

Since the polycarbonate is a polymer film, it is highly susceptible to the influence of external environment such as heat, humidity, and ultraviolet rays in view of the physical property of the material, and the reliability and durability of the color separation/combination means may be reduced.

Japanese Patent Laid-Open No. 11-153774 has disclosed a projection apparatus which employs a reflection type light modulator realized with liquid crystal without a wavelength selective phase shifter. This reference has disclosed a color separation/combination means which employs a PBS having the effect of reflecting p-polarized light and transmitting s-polarized light in a blue wavelength band and transmitting p-polarized light and reflecting s-polarized light in green and red wavelength bands. However, the PBS is only described in terms of its functions, and a method of realizing it has not been disclosed.

A polarizing beam splitter with wavelength selectivity (a wavelength selective polarizing beam splitter) which transmits s-polarized light and reflects p-polarized light in a first wavelength band and reflects s-polarized light and transmits p-polarized light in a second wavelength band different from the first wavelength band has not been realized.

BRIEF SUMMARY OF THE INVENTION

It is an object of the present invention to provide a polarizing beam splitter (wavelength selective polarizing beam splitter) which transmits s-polarized light and reflects p-polarized light in a first wavelength band and reflects s-polarized light and transmits p-polarized light in a second wavelength band different from the first wavelength band.

It is another object of the present invention to realize a projection apparatus which employs the wavelength selective polarizing beam splitter as a color separation/color combination means (a color separation/combination system) of the projection apparatus to simplify the structure and achieve high contrast with excellent reliability and durability.

A polarizing beam splitter of one aspect according to the present invention includes a multilayer film formed by alternately laminating a plurality of H layers and a plurality of L layers having a relatively lower refractive index than a refractive index of the H layers, wherein transmittance of s-polarized light is higher than that of p-polarized light by 60% or higher of the transmittance of the p-polarized light in a first wavelength band having a bandwidth equal to or larger than 30 nm in a visible region, and transmittance of p-polarized light is higher than that of s-polarized light by 60% or higher of the transmittance of the s-polarized light in a second wavelength band different from the first wavelength band in the visible region. Preferably, a light beam incident on the multilayer structure has an incident angle $\theta_O$ which satisfies, $$\theta_o > \tan^{-1}\left(\frac{n_L}{n_P}\right)$$

where $n_P$ represents a refractive index of the incident-side optical member and $n_L$ represents the refractive index of the L layer. A light beam incident on the multilayer structure has an incident angle $\theta_O$ which satisfies, $$\theta_o > \sin^{-1}\left(\frac{n_L}{n_P}\right)$$

where $n_P$ represents a refractive index of the incident-side optical member and $n_L$ represents the refractive index of the L layer, wherein the first wavelength band and the second wavelength band generally match one or two of three bands, that is, a read wavelength band, a green wavelength band, and a blue wavelength band. The following is satisfied, $1.4 \leq n_P \leq 2.1$ where $n_P$ represents a refractive index of a material of the optical member in a visible light wavelength band. The following are satisfied, $n_L \leq n_H$ $1.6 \leq n_H \leq 2.6$ $1.0 \leq n_L \leq 1.7$ where $n_H$ represents the refractive index of a material of the H layer and $n_L$ represents the refractive index of a material of the L layer in a visible light wavelength band.

An image display apparatus of another aspect according to the present invention includes a plurality of reflection type liquid crystal display devices, an optical system which illuminates the plurality of reflection type liquid crystal display devices with a plurality of light beams for colors associated with the respective display devices, and combines and projects the plurality of light beams for colors from the plurality of reflection type liquid crystal display devices, wherein the optical system uses the polarizing beam splitter according to the above to combine the plurality of light beams for colors from the plurality of reflection type liquid crystal display devices.

A projection apparatus of another aspect according to the present invention includes light source means, a polarization changer which unifies non-polarized light into one polarization direction, a dichroic mirror which splits light into reflected light and transmitted light depending on a wavelength band, a polarizing beam splitter which splits light into reflected light and transmitted light depending on a polarization state, the polarizing beam splitter according to the above, a light modulator which modulates a polarization direction in accordance with a signal, a half-wave plate which rotates a polarization direction 90 degrees, a polarizing beam splitter which combines light modulated by the light modulator, and a projection lens which projects the combined light.

A projection apparatus of another aspect according to the present invention includes light source means, a polarization changer which unifies non-polarized light into one polarization direction, a dichroic mirror which splits light into reflected light and transmitted light depending on a wavelength band, a polarizing beam splitter which splits light into reflected light and transmitted light depending on a polarization state, the polarizing beam splitter according to the above, a light modulator which modulates a polarization direction in accordance with a signal, a dichroic prism which combines light modulated by the light modulator, and a projection lens which projects the combined light.

A projection apparatus of another aspect according to the present invention includes light source means, a polarization changer which unifies non-polarized light into one polarization direction, a dichroic mirror which splits light into reflected light and transmitted light depending on a wavelength band, a polarizing beam splitter which splits light into reflected light and transmitted light depending on a polarization state, the polarizing beam splitter according to the above, a light modulator which modulates a polarization direction in accordance with a signal, a dichroic prism which combines light modulated by the light modulator, and a polarizer which blocks leaked light and/or return light toward the light source means, a quarter-wave plate which rotates linearly polarized light to circularly polarized light, and a projection lens which projects the combined light.

BRIEF DESCRIPTION OF THE DRAWINGS

FIGS. 1(a) and 1(b) schematically show the basic operation (characteristic) of a polarizing beam splitter with wavelength selectivity of the first embodiment, and specifically, FIG. 1(a) shows s-polarized light and FIG. 1(b) shows p-polarized light.

FIG. 2 is a view of a model for explaining FTIR.

DETAILED DESCRIPTION OF THE PREFERRED EMBODIMENTS

Figure 3A:
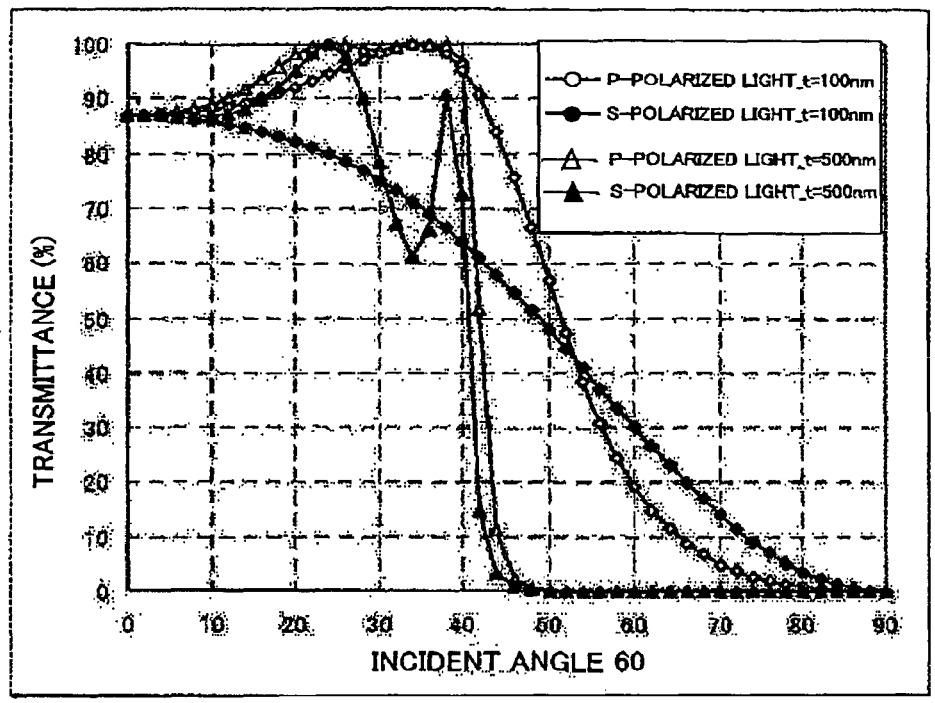
FIG. 3 shows the simulation result of the wavelength characteristic of transmittance and phase of transmitted light of s-polarized light and p-polarized light at a wavelength of 500 nm in a high refractive index medium with an index of 2.0 and a film thickness of 100 nm and 500 nm and a low refractive index medium with an index of 1.37 and a film thickness of 100 nm and 500 nm.

A polarization splitter of this embodiment has a multilayer structure that stacks an H layer and an L layer having a refractive index lower than that of the H layer (preferably between a pair of optical elements). This polarization splitter has a high transmittance to the s-polarized light (as the incident light) in a first wave range, and a low transmittance to the s-polarized light in a second wave range different from the first wave range. In addition, this polarization splitter has a low transmittance to the p-polarized light in the first wave range, and a high transmittance to the p-polarized light in the second wave range. Both the first and second wave ranges have 30 nm or greater, and the transmission difference between the s-polarized light and the p-polarized light is 60% or greater (preferably 75% or greater) in their wave ranges of 30 nm or greater (preferably 50 nm or greater, more preferably 70 nm or greater).

A projection apparatus (image display apparatus) that has such the polarizing beam splitter has been described in the following embodiments. The projection apparatus has effects for a miniaturization of the entire apparatus and a reduction in the number of parts by arranging the above polarizing beam splitter at a position opposed to a reflection type liquid crystal panel of course, the polarizing beam splitter of the instant embodiment is not limited to the projection apparatus, and may be used for other optical apparatuses.

A description will be given the embodiment of the present invention.

First Embodiment

FIG. 1 is a partially sectional view of a polarizing beam splitter with wavelength selectivity (wavelength selective polarizing beam splitter) of the first embodiment, and simply illustrates a basic operation (function).

The wavelength selective polarizing beam splitter 1 is formed by bonging a prism on an incident side (an optical member) 11 and a prism on an emergence side (an optical member) 12 as shown in FIG. 1. A multilayer film structure 10 with a structure described later is provided on a plane inclined 45 degrees with respect to an incident surface 110 of the incident-side prism 11 and an emergence surface 121 of the emergence-side prism 12.

A basic incident angle of luminous flux incident on the multilayer film structure 10 is 45°. The basic operation of the wavelength selective polarizing beam splitter 1 depends on the polarization direction and wavelength band.

It is assumed that a light beam 20 of s-polarized light in a blue wavelength band and a light beam 40 of s-polarized light in a red wavelength band are incident on the wavelength selective polarizing beam splitter 1. In this case, as shown in FIG. 1 (a), the light beam 20 in the blue wavelength band is transmitted through the multilayer structure 10 and emerges from the emergence surface 121, while the light beam 40 in the red wavelength band is reflected by the multilayer film structure 10 and emerges from an emergence surface 111.

When a light beam 21 of p-polarized light in the blue wavelength band and a light beam 41 of p-polarized light in the red wavelength band are incident thereon, the light beam 21 in the blue wavelength band is reflected by the multilayer film structure 10 and emerges from the emergence surface 111, while the light beam 41 in the red wavelength band is transmitted through the multilayer structure 10 and emerges from the emergence surface 121 as shown in FIG. 1 (b).

The multilayer film structure 10 has a structure laminated a H layer with relatively high refractive index and a L layer with relatively low refractive, and uses a prism that consists of material with high refractive index.

Usually, when the luminous flux is incident on the low refractive index medium from the high refractive index medium by more than a critical angle, a total reflection is caused. At the total reflection, the evanescent wave is caused in an area at the wavelength level. When another medium exists in the area that the evanescent wave is caused, the light transmits. This phenomenon can be treated similar to the tunnel effect of the electron, and is called a frustrated total internal reflection (FTIR).

The transmittance and the phase of the frustrated total internal reflection light are different according to s-polarized light and p-polarized light. FIG. 2 is an explanation view of a model that the incident light is incidence on a structure to place a low refractive index medium 61 between a high refractive index medium 60 by incidence angle $\theta_O$.

The refractive index of the high refractive index medium 60 is assumed to be 2.0, the refractive index of the low refractive index medium 61 is assumed to be 1.37, and FIG. 3 (a) and FIG. 3 (b) shows the wavelength characteristic of transmittance and phase of transmitted light of s-polarized light and p-polarized light to each other in wavelength of 550 nm when a thickness d of the low refractive index medium 61 is 100 nm and 500 nm. Film Wizard that is the thin film design software of Scientific Computing International Company was used for the calculation.

The transmittance of p-polarized light does not depend on the film thickness in the vicinity of the Brewster angle of 34.4°, and become almost 1. When the critical angle is 43.2° or more, the transmittance of the film thickness of 500 nm of s-polarized light and p-polarized light become almost 0. However, the transmittance of the film thickness of 500 nm is not 0 for the incident angle with more than the critical angle, and a part of light transmits.

Concerning the phase of transmitted light, in the film thickness of 500 nm, the phase difference between s-polarized light and p-polarized light appears more than the critical angle of 43.2°. In the film thickness of 100 nm, the phase difference between s-polarized light and p-polarized light appears more than the Brewster angle of 34.4°, and increases more than the critical angle of 43.2°.

It is understood from this relationship that when the light enters at an incident angle greater than the Brewster angle, a structure that sandwiches the low refractive index material between the high refractive index materials, the transmitting light and the transmittance phase differ between the s-polarized light and the p-polarized light. As a result, different interferences occur between the s-polarized light and the p-polarized light.

Figure 4:
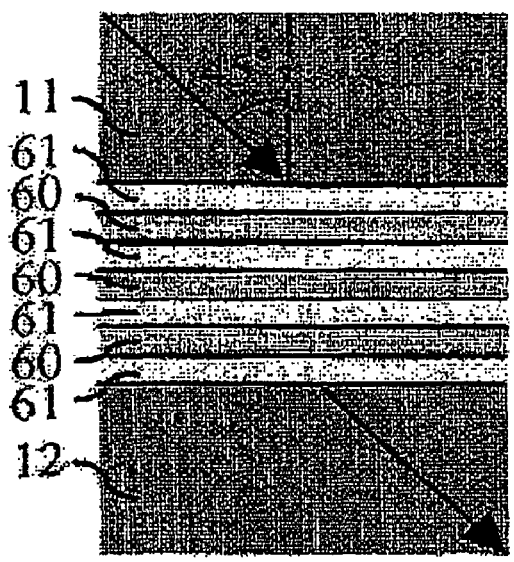
FIG. 4 shows a basic structure of the selective polarization splitter in which the light is incident at an incident angle of 45° upon a multilayer structure that stacks seven L and H layers alternately between a pair of high refractive index prism.

FIG. 4 shows an explanatory view of a model in which the incident light enters at an incident angle of 45°, a multilayer structure that alternately stacks seven layers of L layer 61 made of a low refractive index material and H layer 60 made of a high refractive index material between high refractive index prisms 11 and 12 (made of a material having a high refractive index). Both the high refractive index prisms 11 and 12 are made of a material having a refractive index of 2.0. The material of the L layer 61 has a refractive index of 1.37, and the material of the H layer 60 has a refractive index of 2.35.

Figure 5:
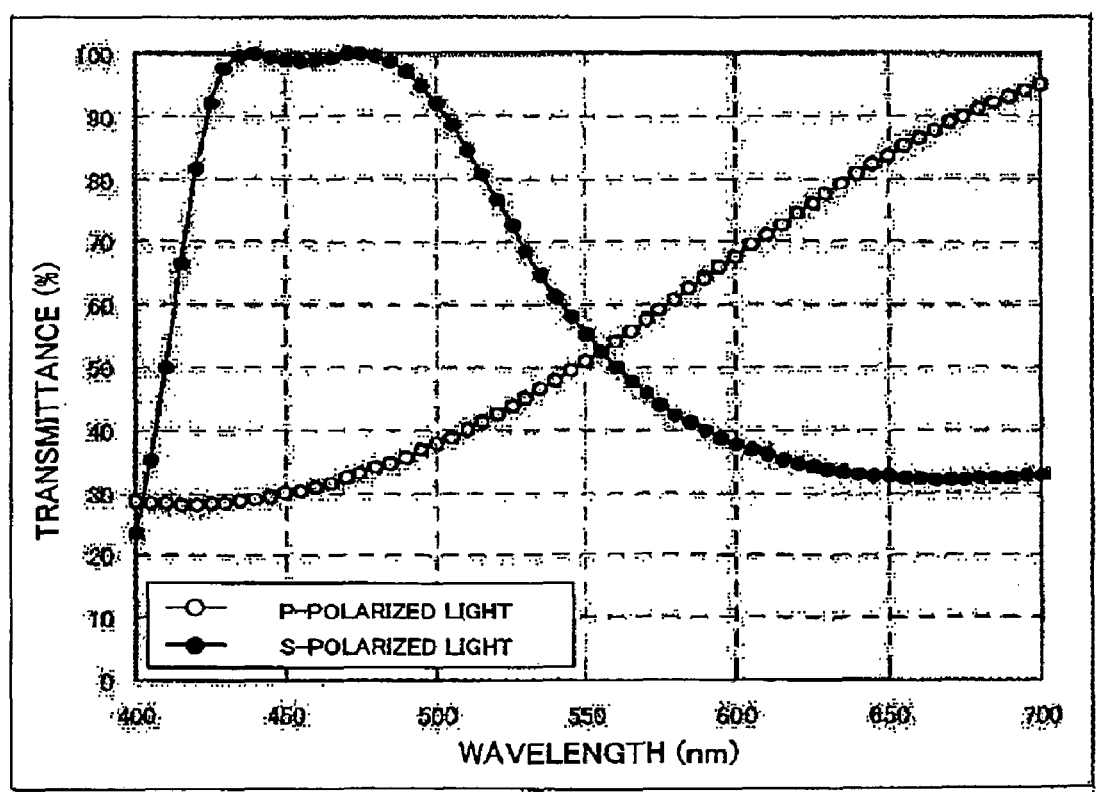
FIG. 5 shows the simulation result of the wavelength characteristic of transmittance of s-polarized light and p-polarized light in the structure expressed as Prism|1.0L 0.5H 1.0L 1.0H 1.0L 0.5H 1.0L|Adhesive at a wavelength of 550 nm when a high index prism has an index of 2.0, a L layer thin film has a refractive index of 1.37, and a H layer thin film has a refractive index of 2.35.

FIG. 5 shows wavelength characteristics of the transmittance of the s-polarized light and the p-polarized light in a structure at the wavelength of 550 nm. The structure includes in order of prism|1.0 L 0.5 H 1.0 L 1.0 H 1.0 L 0.5 H 1.0 L|prism, where H is a high refractive index layer that satisfies nd=λ/4, 0.5H a high refractive index layer that satisfies nd=λ/8, and L is a low refractive index layer that satisfies nd=λ/4. n is a refractive index, d is a thickness, and λ is a designed wavelength.

It is understood that the basic characteristic of the selective polarization splitter ("SPS") transmits the s-polarized light and reflects p-polarized light in the blue wave range (from 420 nm to 500 nm), and reflects the s-polarized light and transmits the p-polarized light in the red wave range (from 580 nm to 680 nm).

Nevertheless, this characteristic is insufficient in terms of both the wave range and the polarization splitting. Therefore, the number of layers is increased in the multilayer structure and the thickness is optimized. The first embodiment is the design example.

Figure 6:
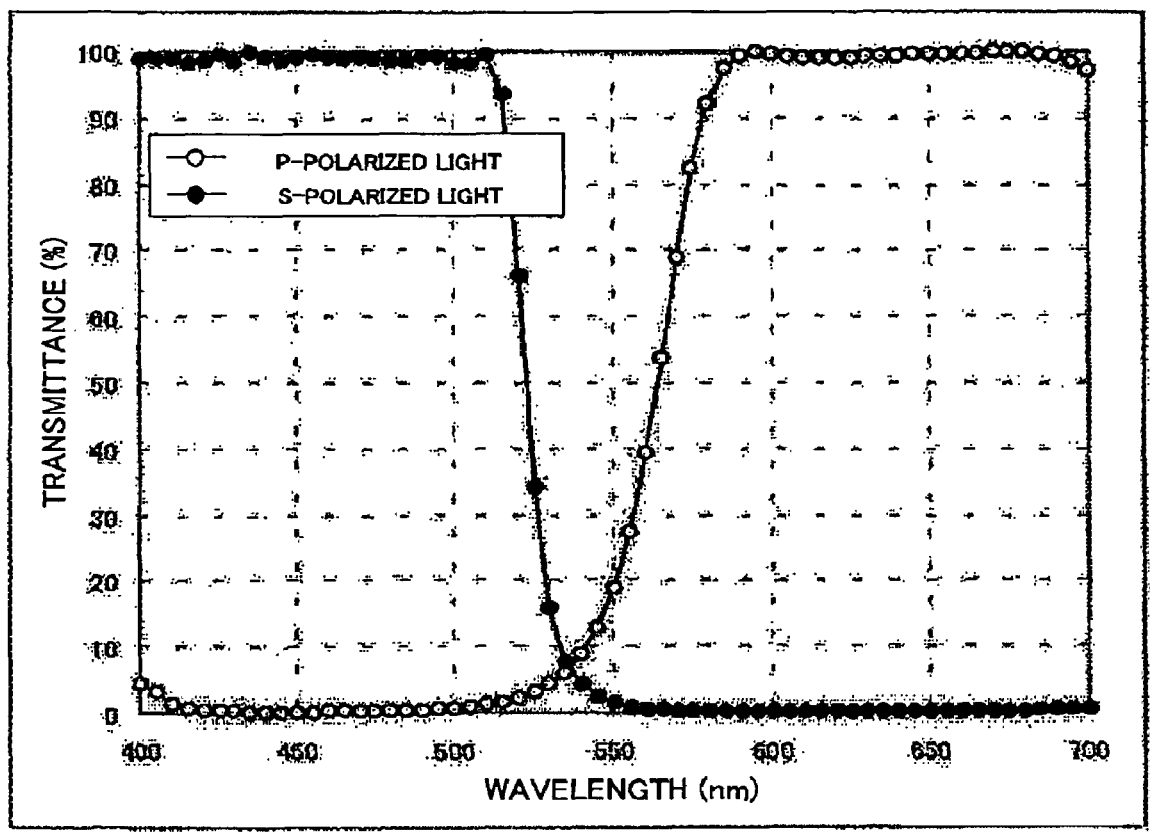
FIG. 6 shows the simulation result of transmittance of s-polarized light and p-polarized light in a wavelength selective polarizing beam splitter in the first embodiment.

Table 1 shows design values of a structure of the first embodiment. Numerical values of H and L in Table 1 denote their layers' thicknesses. FIG. 6 shows a simulation result of this SPS.

Both of the two prisms are OHARA's trade name S-LAH79 having a refractive index 2.01 at a wavelength of 550 nm. The H layer is $TiO_2$ having a refractive index of 2.32 at the wavelength of 550 nm. The L layer is $MgF_2$ having a refractive index of 1.39 at the wavelength of 550 nm. The critical angle is 43.7° obtained from the refractive index difference between the prism and L layer at the wavelength of 550 nm, and the Brewster angle is 34.7°.

The multilayer structure stacks 31 L and H layers of alternately, and the incident angle upon the multilayer structure is 45° greater than the critical angle. This structure transmits the s-polarized light and reflects p-polarized light in the blue wave range (from 420 nm to 500 nm), and reflects the s-polarized light and transmits the p-polarized light in the red wave range (from 580 nm to 680 nm). It is understood that its optical characteristic, the wave range and polarization splitting are excellent.

By optimizing the number of layers and thickness, the optical characteristic further improves. However, the number of layers and thickness are not limited to this scheme. This is true of the following embodiments.

In addition, the SPS in each of the following embodiments has the same basic structure as that shown in FIG. 4, although it has the different number of coating layers, the different thickness, and the different material.

Second Embodiment

Figure 7:
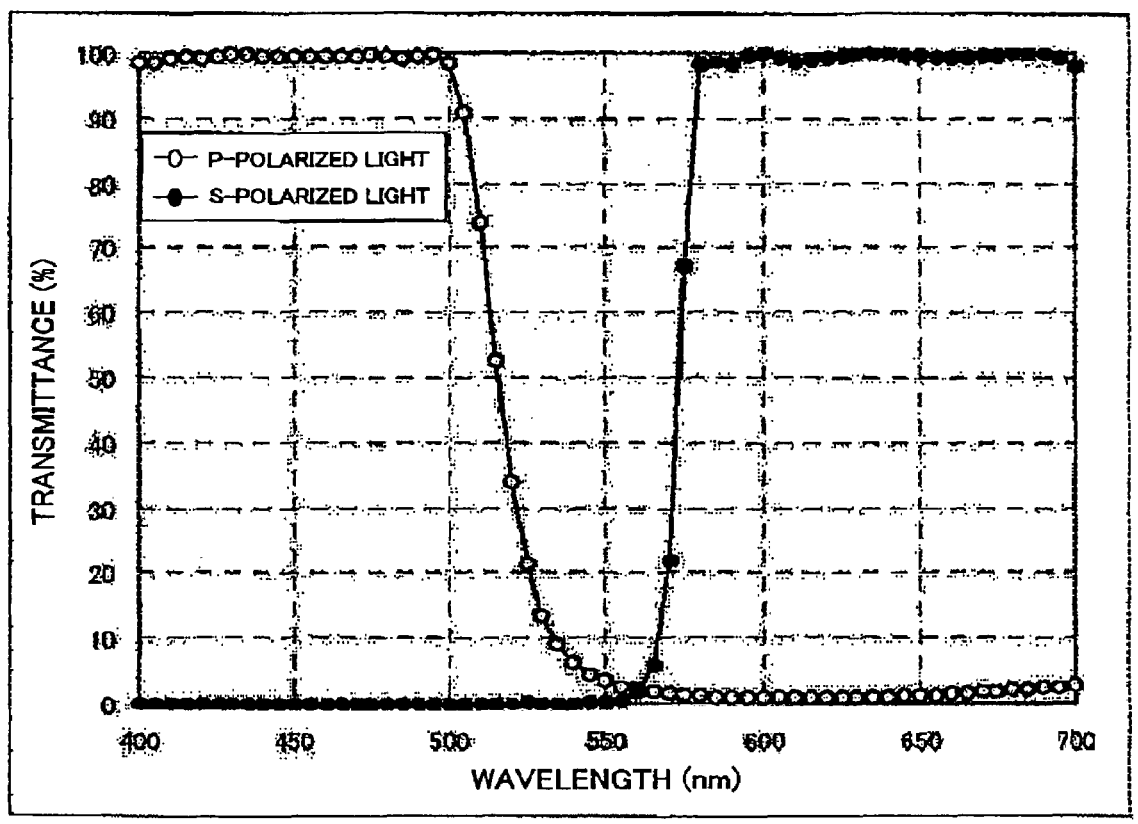
FIG. 7 shows the simulation result of transmittance of s-polarized light and p-polarized light in a wavelength selective polarizing beam splitter in the second embodiment.

Table 1 shows design values of a structure of a second embodiment. FIG. 7 shows a simulation result of this selective polarization splitter ("SPS").

Both of the two prisms are OHARA's trade name S-LAH79 having a refractive index 2.01 at a wavelength of 550 nm. The H layer is $TiO_2$ having a refractive index of 2.32 at the wavelength of 550 nm. The L layer is $MgF_2$ having a refractive index of 1.39 at the wavelength of 550 nm. The critical angle is 43.7° obtained from the refractive index difference between the prism and L layer at the wavelength of 550 nm, and the Brewster angle is 34.7°.

The multilayer structure stacks 31 L and H layers of alternately, and the incident angle upon the multilayer structure is 45° greater than the critical angle. This structure transmits the s-polarized light and reflects p-polarized light in the red wave range, and reflects the s-polarized light and transmits the p-polarized light in the blue wave range. This embodiment has an inverse characteristic to the first embodiment with respect to the transmission and reflection of the s-polarized light and p-polarized light. When the materials of the prism, H layer and the L layer, the incident angle and the number of layers are different in the multilayer structure are the same, the good characteristic can be obtained even if a relationship between the transmission and reflection is inverted.

Third Embodiment

Figure 8:
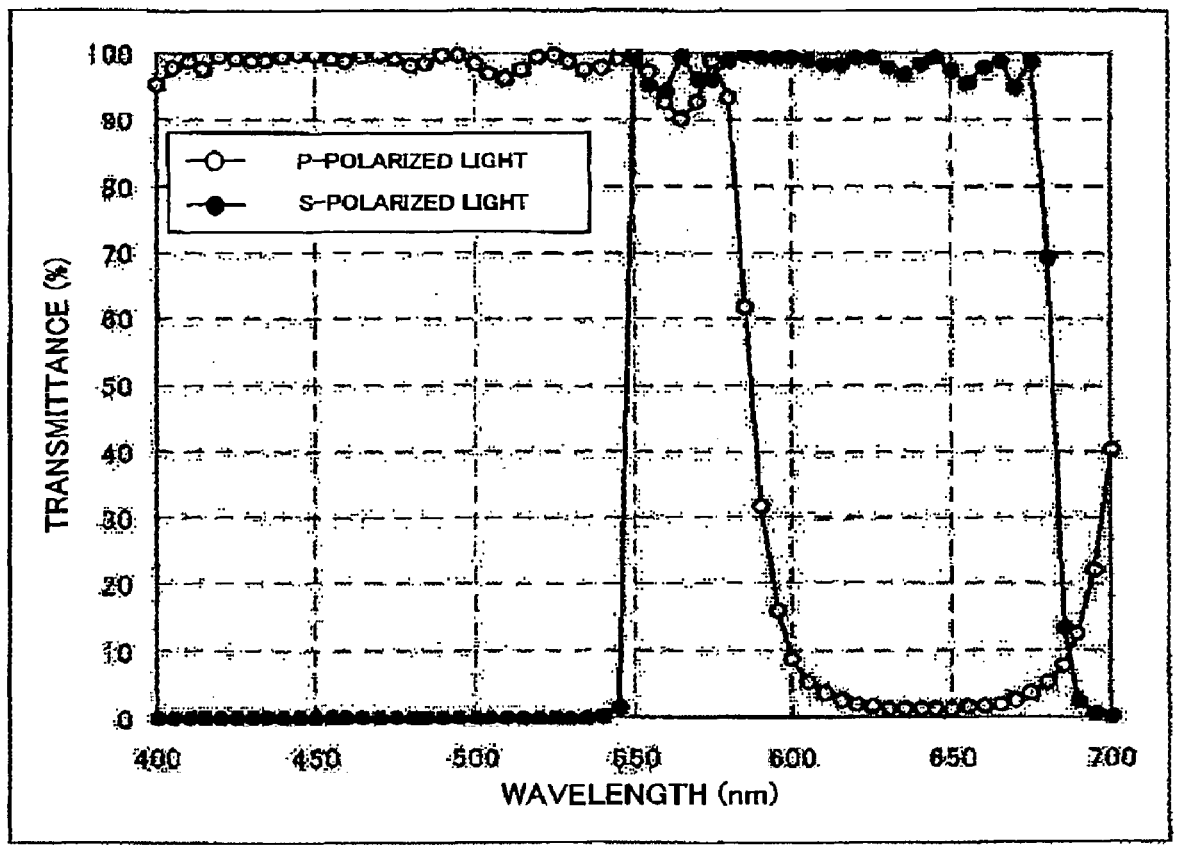
FIG. 8 shows the simulation result of transmittance of s-polarized light and p-polarized light in a wavelength selective polarizing beam splitter in the third embodiment.

Table 1 shows design values of a structure of a third embodiment. FIG. 8 shows a simulation result of this selective polarization splitter ("SPS").

Both of the two prisms are OHARA's trade name S-LAH79 having a refractive index 2.01 at a wavelength of 550 nm. The H layer is $TiO_2$ having a refractive index of 2.32 at the wavelength of 550 nm. The L layer is $SiO_2$ having a refractive index of 1.49 at the wavelength of 550 nm. The critical angle is 47.70 obtained from the refractive index difference between the prism and L layer at the wavelength of 550 nm, and the Brewster angle is 36.5°.

The multilayer structure stacks 51 L and H layers of alternately, and the incident angle upon the multilayer structure is 45° greater than the Brewster angle. This structure transmits the s-polarized light and reflects p-polarized light in the red wave range, and reflects the s-polarized light and transmits the p-polarized light in the blue wave range. The incident angle, the material of prism and the material of H layer are the same. On the other hand, the material of L layer is $SiO_2$ that the refractive index is higher than $MgF_2$.

Therefore, the incident angle of 45° becomes the critical angle of 47.7° or less from the Brewster angle of 36.5° or more.

If the critical angle is even 47.7° or less more than the Brewster angle, the good characteristic can be obtained. If the material of L layer is the low refraction material, it is not limited.

Fourth Embodiment

Figure 9:
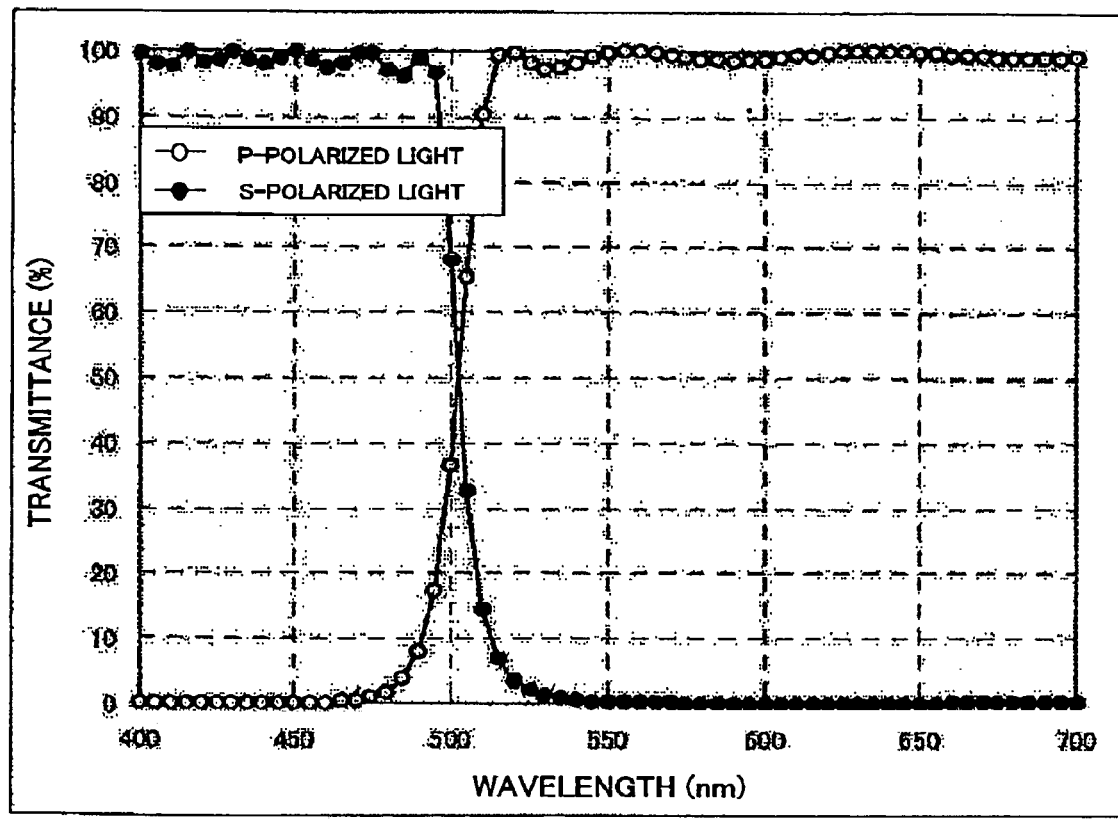
FIG. 9 shows the simulation result of transmittance of s-polarized light and p-polarized light in a wavelength selective polarizing beam splitter in the fourth embodiment.

Table 1 shows design values of a structure of a fourth embodiment. FIG. 9 shows a simulation result of this selective polarization splitter ("SPS").

Both of the two prisms are OHARA's trade name S-LAH79 having a refractive index 2.01 at a wavelength of 550 nm. The H layer is $Ta_2O_5$ having a refractive index of 1.39 at the wavelength of 550 nm. The L layer is $MgF_2$ having a refractive index of 1.39 at the wavelength of 550 nm. The critical angle is 43.7° obtained from the refractive index difference between the prism and L layer at the wavelength of 550 nm, and the Brewster angle is 34.7°.

The multilayer structure stacks 31 L and H layers of alternately, and the incident angle upon the multilayer structure is 45° greater than the critical angle. This structure transmits the s-polarized light and reflects p-polarized light in the blue wave range, and reflects the s-polarized light and transmits the p-polarized light in the yellow (green+red) wave range (wavelength of 500 to 680 nm).

The transition band that changes from the transmitted band to the reflection band of s-polarized light and p-polarized light is narrow, and the transition wavelength shifts to the short wavelength side compared with the first embodiment. The incident angle, the material of prism and the material of L layer are the same. On the other hand, the material of H layer is $Ta_2O_5$ that the refractive index is lower than $SiO_2$.

Then, the good characteristic can be obtained by the control of the transition band and shift of transition wavelength. If the material of H layer is the high refraction material, it is not limited.

Fifth Embodiment

Figure 10:
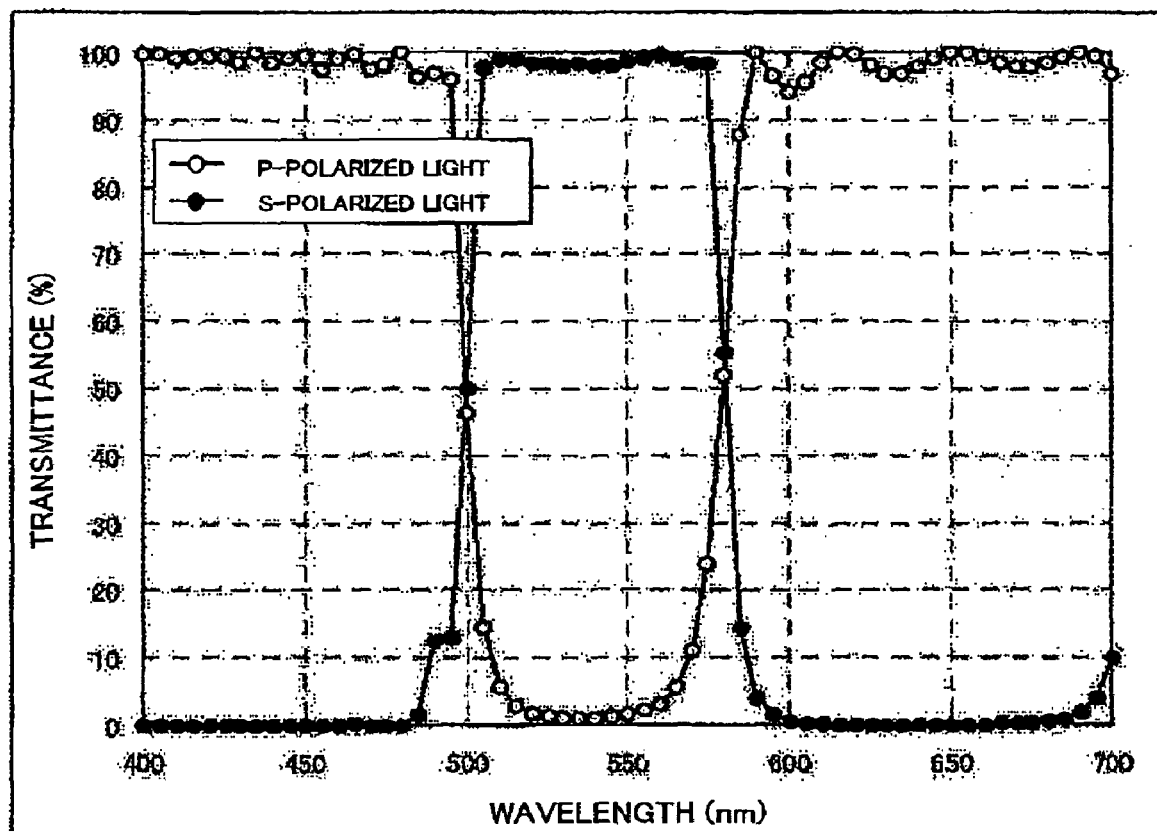
FIG. 10 shows the simulation result of transmittance of s-polarized light and p-polarized light in a wavelength selective polarizing beam splitter in the fifth embodiment.

Table 1 shows design values of a structure of a fifth embodiment. FIG. 10 shows a simulation result of this SPS. Both of the two prisms are OHARA's trade name S-LAH79 having a refractive index 2.01 at a wavelength of 550 nm. The H layer is $TiO_2$ having a refractive index of 2.32 at the wavelength of 550 nm. The L layer is $MgF_2$ having a refractive index of 1.39 at the wavelength of 550 nm. The critical angle is 43.7° obtained from the refractive index difference between the prism and L layer at the wavelength of 550 nm, and the Brewster angle is 34.7°.

The multilayer structure stacks 51 L and H layers of alternately, and the incident angle upon the multilayer structure is 45° greater than the critical angle. As with the optical characteristic, this structure transmits the s-polarized light and reflects p-polarized light in the green wave range (from 500 nm to 680 nm), and reflects the s-polarized light and transmits the p-polarized light in the magenta wave range (from 420 nm to 500 nm and 580 nm to 680 nm).

Thus, the characteristic remains excellent even when the second wave range is divided into the blue and red wave ranges with respect to the green wave range (as the first wave range). In other words, the green wave range covers the first wave range in which the transmittance of the s-polarized light is high and the transmittance of the p-polarized light is low. The red and blue wave ranges cover the second wave range in which the transmittance of the p-polarized light is high and the transmittance of the s-polarized light is low.

In this embodiment, the first and second wave ranges approximately accord with one or two wave ranges out of these three, i.e., red, blue and green, wave ranges.

When the white light (which contains all of the red, blue and green lights) of the s-polarized light (or the p-polarized light) is incident upon the polarization splitter of this embodiment, the green light is transmitted and the red and blue lights are reflected. This configuration separates the color with a simple structure, i.e., using one SPS of this embodiment, and is suitable of the image display unit (or a liquid crystal image display unit).

Sixth Embodiment

Figure 11:
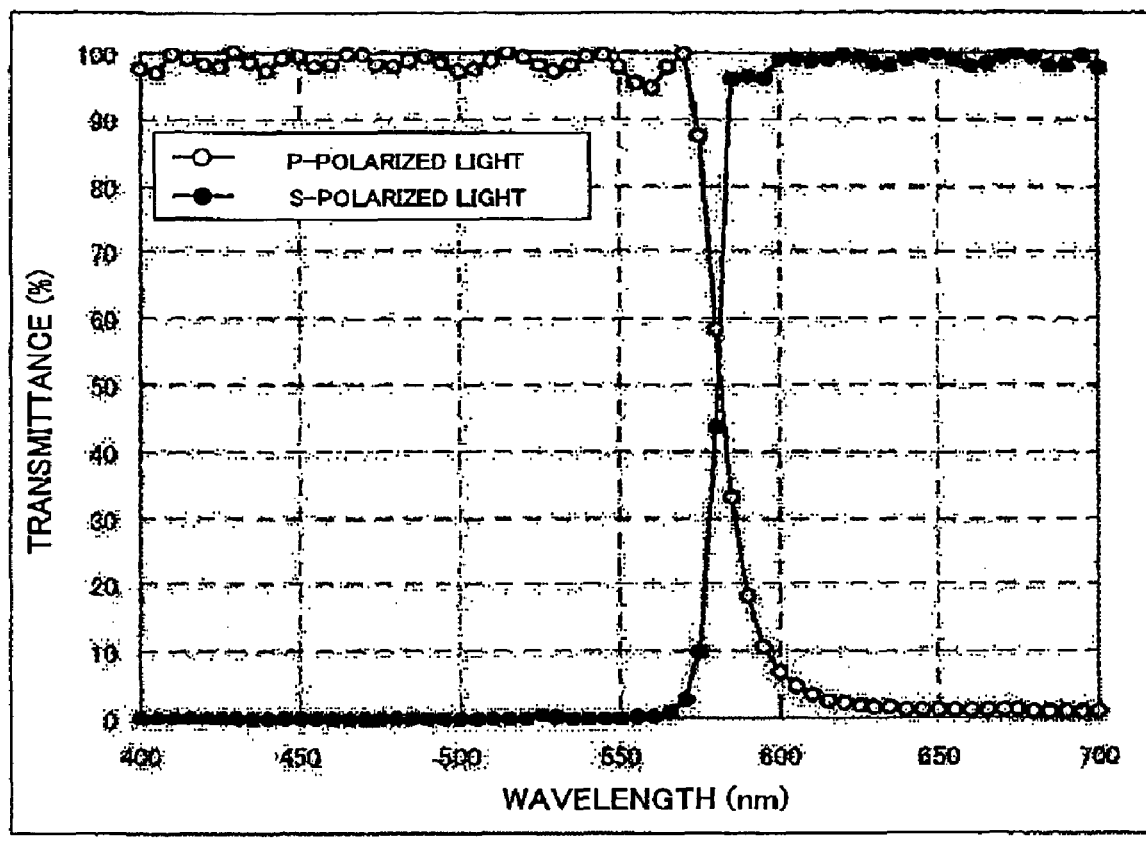
FIG. 11 shows the simulation result of transmittance of s-polarized light and p-polarized light in a wavelength selective polarizing beam splitter in the sixth embodiment.

Table 1 shows design values of a structure of a fifth embodiment. FIG. 11 shows a simulation result of this SPS. Both of the two prisms are OHARA's trade name S-LAH79 having a refractive index 2.01 at a wavelength of 550 nm. The H layer is $TiO_2$ having a refractive index of 2.32 at the wavelength of 550 nm. The L layer is $MgF_2$ having a refractive index of 1.39 at the wavelength of 550 nm. The critical angle is 60.0° obtained from the refractive index difference between the prism and L layer at the wavelength of 550 nm, and the Brewster angle is 40.9°.

The multilayer structure stacks 35 L and H layers of alternately, and the incident angle upon the multilayer structure is 45° equal with the critical angle. As with the optical characteristic, this structure transmits the s-polarized light and reflects p-polarized light in the red wave range, and reflects the s-polarized light and transmits the p-polarized light in the cyan wave range (from 420 nm to 500 nm).

The transition band that changes from the transmitted band to the reflection band of s-polarized light and p-polarized light is narrow, and the transition wavelength shifts to the long wavelength side compared with the first embodiment. Then, the good characteristic can be obtained if the incident angle is more than the Brewster angle even if the refractive index of the prism is small. In other words, it is not limited to the refractive index of the prism.

Seventh Embodiment

Although the first to sixth embodiments are designed by taking the specific incident angle into account, the evanescent wave that leaks from the high refractive index material to the low refractive index material has a high dependency to the incident angle.

Figure 3B:
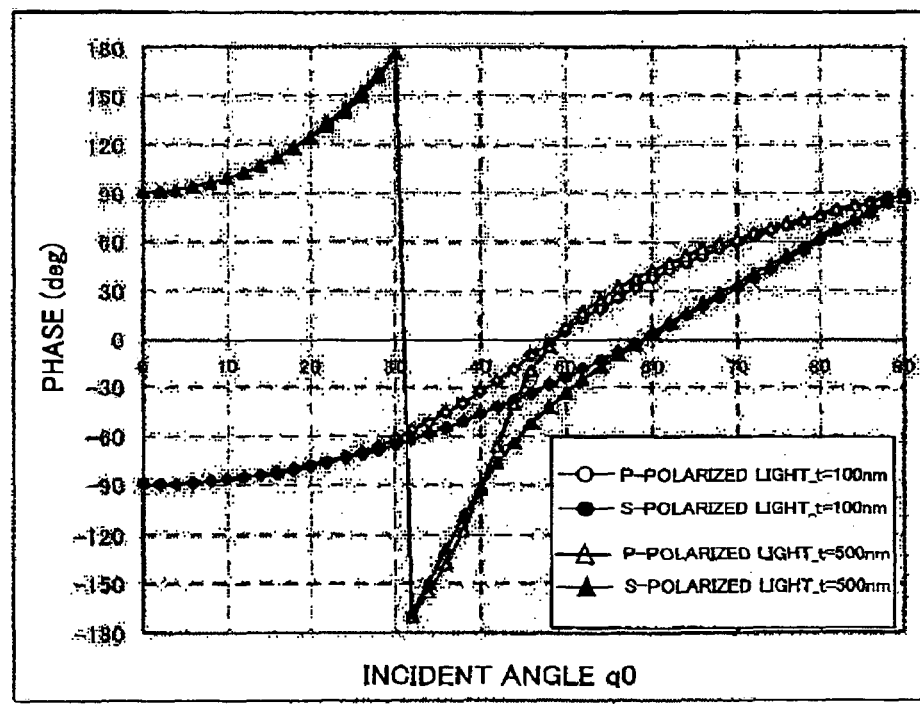

The seventh embodiment exhibits a good incident angle characteristic, and is designed to operated in a certain incident angle range. The evanescent wave becomes sensitive as the incident angle is close to the critical angle as shown in FIG. 3B. Therefore, the angular characteristic becomes good as the incident angle increases from the critical angle.

In addition, the angular characteristic improves with the same incident angle when the critical angle shifts to the lower incident angle side by making the refractive index of the material of the prism higher or by making the refractive index of the low refractive index material lower.

Figure 12A:
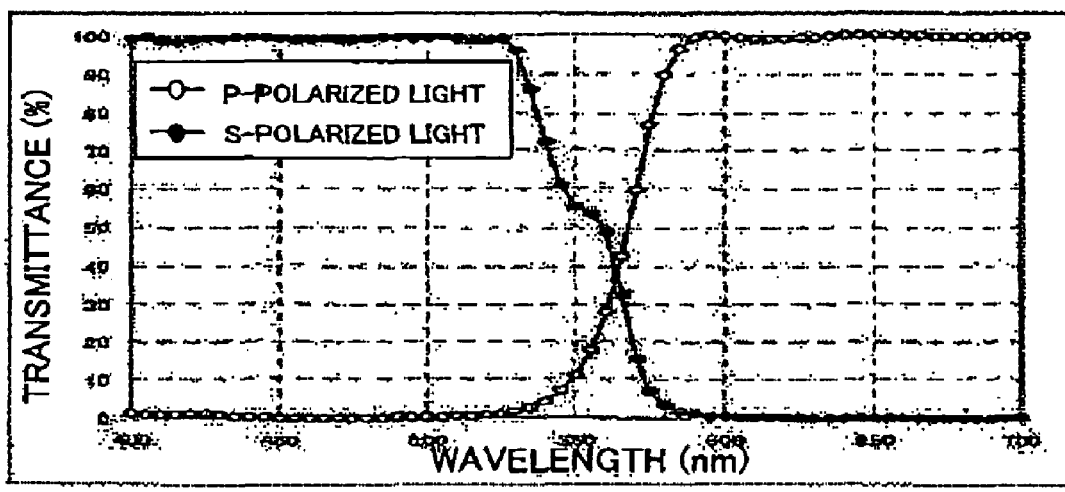
FIG. 12 shows the simulation result of transmittance of s-polarized light and p-polarized light in a wavelength selective polarizing beam splitter in the seventh embodiment, FIG. 12 (a) is an incident angle of 42.5°, FIG. 12 (b) is an incident angle of 45°, and FIG. 12 (c) is an incident angle of 47.5°.
Figure 12B:
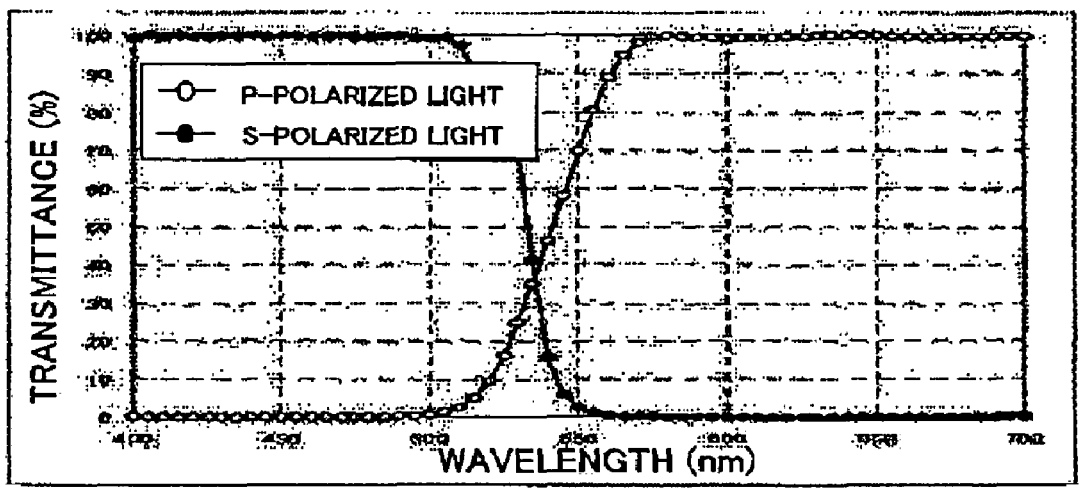
Figure 12C:
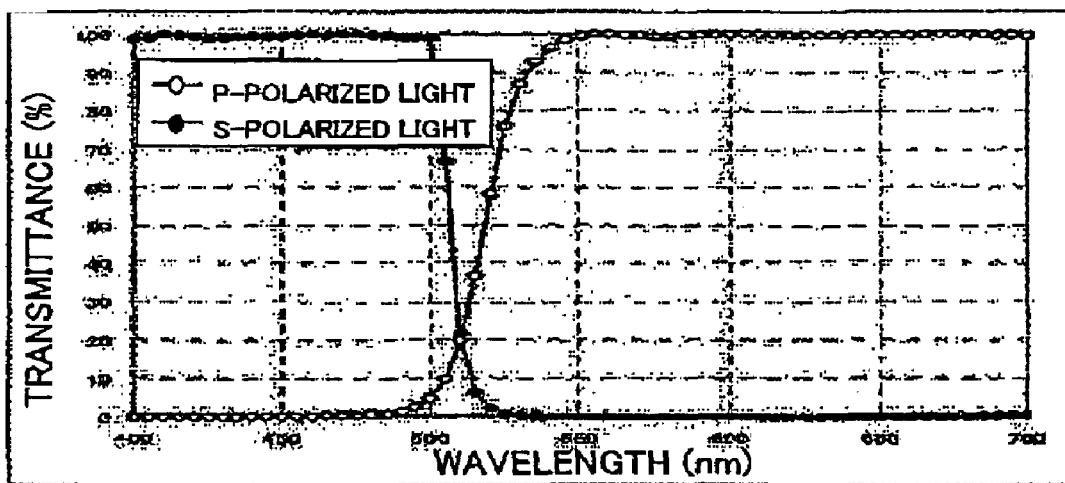

Table 1 shows design values of a structure of the seventh embodiment. FIGS. 12A to 12C show the simulation results of this SPS. The incident angle is 42.5° in FIG. 12A. The incident angle is 45° in FIG. 12B. The incident angle is 47.5° in FIG. 12C. Both prisms are OHARA's trade name PBH56 having a refractive index 1.85 at a wavelength of 550 rm. The H layer is $TiO_2$ having a refractive index of 2.32 at the wavelength of 550 nm. The L layer is a material having a refractive index of 1.15 (assumed to have no dispersion). The critical angle is 38.5° obtained from the refractive index difference between the prism and L layer at the wavelength of 550 nm, and the Brewster angle is 31.9°.

The multilayer structure stacks 49 L and H layers of alternately, and the incident angle upon the multilayer structure is 45±2.50 that is greater than the critical angle and has an angular characteristic. As the incident angle increases, the transition wavelength shifts to the short wave side. This embodiment allows the transition wave range to cover the overall range of the green wave range (from a wavelength of 500 nm to 580 nm). In the specific angular range, this structure transmits the s-polarized light and reflects p-polarized light in the blue wave range, and reflects the s-polarized light and transmits the p-polarized light in the red wave range, exhibiting good characteristic.

The L layer as a low refractive index material having a refractive index of 1.15 may use a nano-porous material etc., as disclosed in J. Hiller, J. D. Mendelsohn, and M. F. Rubner, Nature Mater., Vol. 1, p. 54 2002. Since the dispersion of the refractive index is not described, no dispersion is assumed.

Eighth Embodiment

Figure 13A:
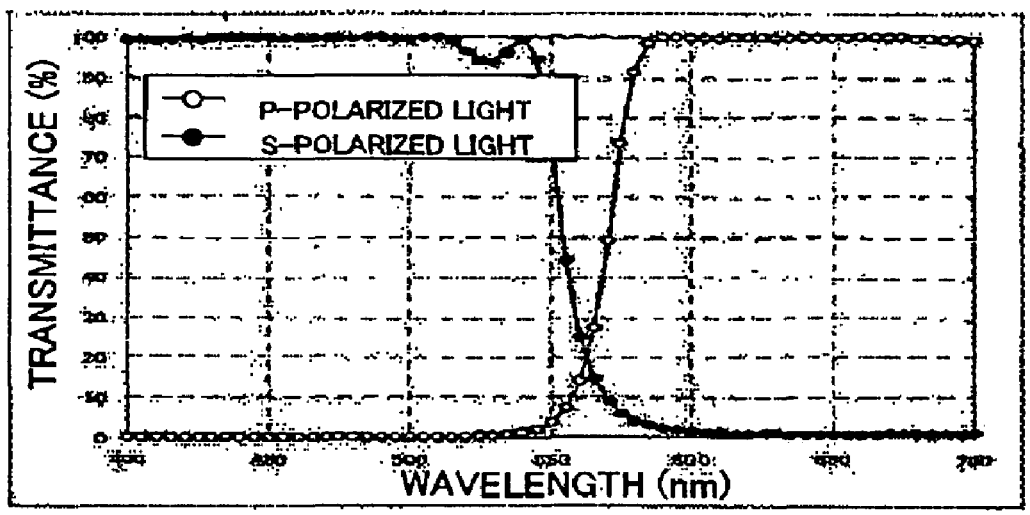
FIG. 13 shows the simulation result of transmittance of s-polarized light and p-polarized light in a wavelength selective polarizing beam splitter in eighth embodiment, FIG. 13 (a) is an incident angle of 42.5°, FIG. 13 (b) is an incident angle of 45°, and FIG. 13 (c) is an incident angle of 47.5°.
Figure 13B:
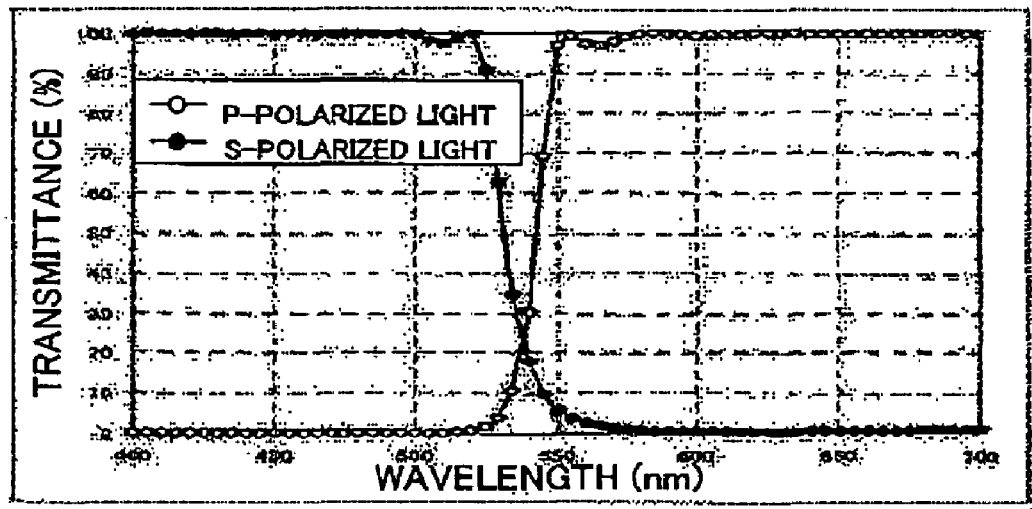
Figure 13C:
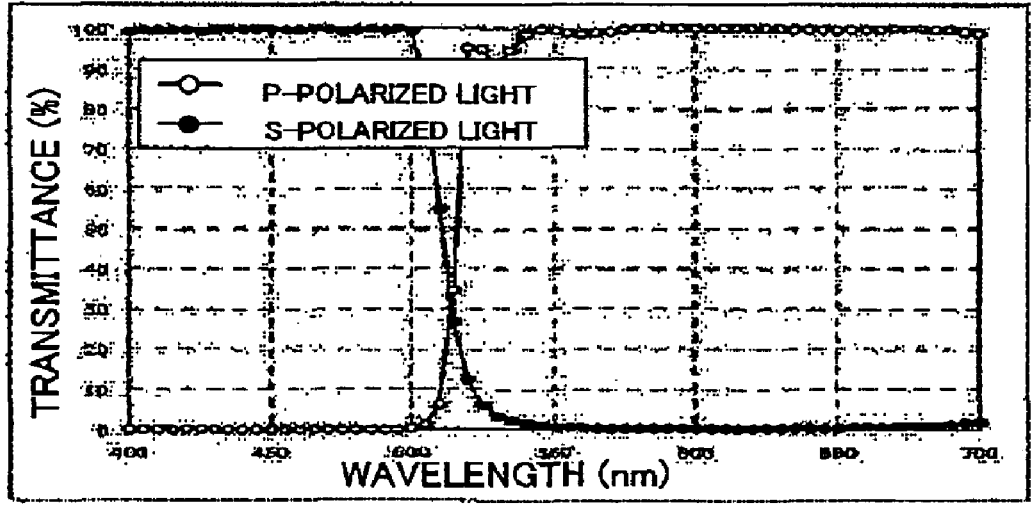

Table 1 shows design values of a structure of an eight embodiment. FIGS. 13A to 13C show a simulation result of this SPS. The incident angle is 42.5° in FIG. 13A. The incident angle is 45° in FIG. 13B. The incident angle is 47.5° in FIG. 13C. Both prisms are OHARA's trade name PBH56 having a refractive index 1.85 at a wavelength of 550 nm. The H layer is $TiO_2$ having a refractive index of 2.32 at the wavelength of 550 nm. The L layer is air having a refractive index of 1.00. The critical angle is 32.7° obtained from the refractive index difference between the prism and L layer at the wavelength of 550 nm, and the Brewster angle is 28.4°.

The multilayer structure stacks 50 L and H layers of alternately, and the incident angle upon the multilayer structure is 45±2.50 that is greater than the critical angle and has an angular characteristic. As with the optical characteristic, this structure transmits the s-polarized light and reflects p-polarized light in the blue wave range (from 42 nm to 500 nm), and reflects the s-polarized light and transmits the p-polarized light in the red wave range (from 580 nm to 680 nm). Similar to the seventh embodiment, this embodiment exhibits an excellent angular characteristic. The air layer as the L layer is formed by making a sacrifice layer having a corresponding thickness, and removing only the sacrifice layer through selective etching after all the layers are formed.

Nineth Embodiment

Figure 14A:
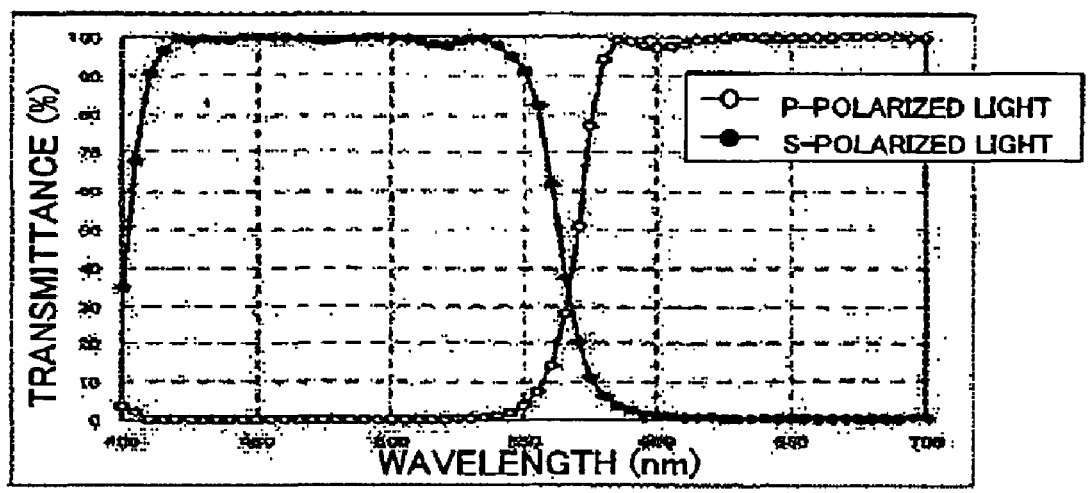
FIG. 14 shows the simulation result of transmittance of s-polarized light and p-polarized light in a wavelength selective polarizing beam splitter in ninth embodiment, FIG. 14 (a) is an incident angle of 42.5°, FIG. 14 (b) is an incident angle of 45°, and FIG. 14 (c) is an incident angle of 47.5°.
Figure 14B:
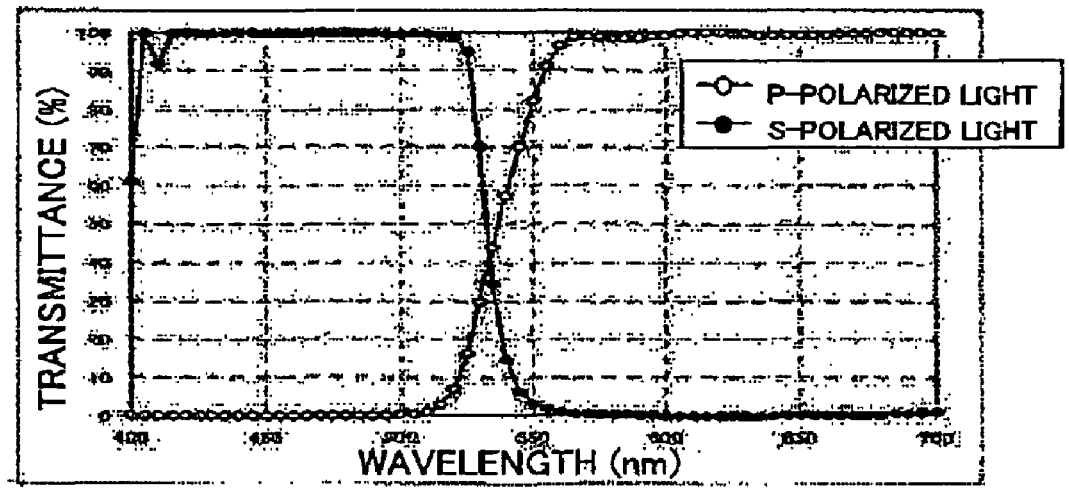
Figure 14C:
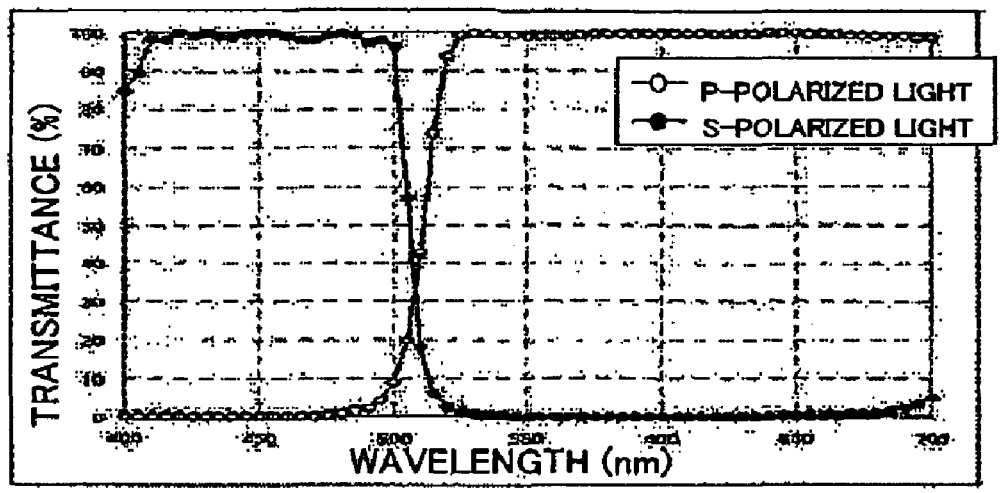

Table 1 shows design values of a structure of a ninth embodiment. FIGS. 14A to 14C show a simulation result of this SPS. The incident angle is 57.5° in FIG. 14A. The incident angle is 60° in FIG. 14B. The incident angle is 62.5° in FIG. 14C. Both prisms are OHARA's trade name PBH56 having a refractive index 1.85 at a wavelength of 550 nm. The H layer is $TiO_2$ having a refractive index of 2.32 at the wavelength of 550 nm. The L layer is $MgF_2$ having a refractive index of 1.39 at the wavelength of 550 nm. The critical angle is 48.8° obtained from the refractive index difference between the prism and L layer at the wavelength of 550 nm, and the Brewster angle is 36.90. The multilayer structure stacks 49 L and H layers of alternately, and the incident angle upon the multilayer structure is 60±2.50 that is greater than the critical angle and has an angular characteristic. As with the optical characteristic, this structure transmits the s-polarized light and reflects p-polarized light in the blue wave range (from 42 nm to 500 nm), and reflects the s-polarized light and transmits the p-polarized light in the red wave range (from 580 nm to 680 nm). Similar to the seventh and eight embodiments, this embodiment exhibits an excellent angular characteristic by increasing the incident angle.

In the SPS of the first to ninth embodiments, the incident side optical element and the exit side optical element are made of the same material or materials having the same refractive index. However, this is not requisite, and the incident side optical element and the exit side optical element may be made of materials having different refractive indexes. In addition, while no element exists between the multilayer film and the incident side optical element and between the multilayer film and the exit side optical element in the SPS of the first to ninth embodiments, only one or both of them may have an adhesion layer.

Here, in the above embodiments 1 to 9, the refractive index of H layer is desirably 2.00 or more (preferably 2.10 or more, and more preferably 2.25 or more) and 2.8 or less (preferably 2.65 or less). Moreover, the refractive index of L layer is desirably 1.55 or less (preferably 1.40 or less, and more preferably 1.20 or less). The refractive index of the prism on incident side and exit side of the multilayer film is desirably 1.50 or more (preferably 1.60 or more) and 2.50 or less (preferably 2.30 or less and more preferably 2.10 or less). The refractive index difference between H layer and layer is 0.65 or more (preferably 0.75 or more, and more preferably 0.85 or more) and 1.50 or less (preferably 1.25 or less).

The number of layers of the multilayer film is desirably 30 layers or more (preferably 40 layers or more, and more preferably 45 layers or more) and 80 layers or less (preferably 65 layers or less).

The multilayer film described in the above first to ninth embodiments does not have to stack a coating structure, but may stack structures having refractive indexes described in the first to ninth embodiments.

Tenth Embodiment

Figure 15:
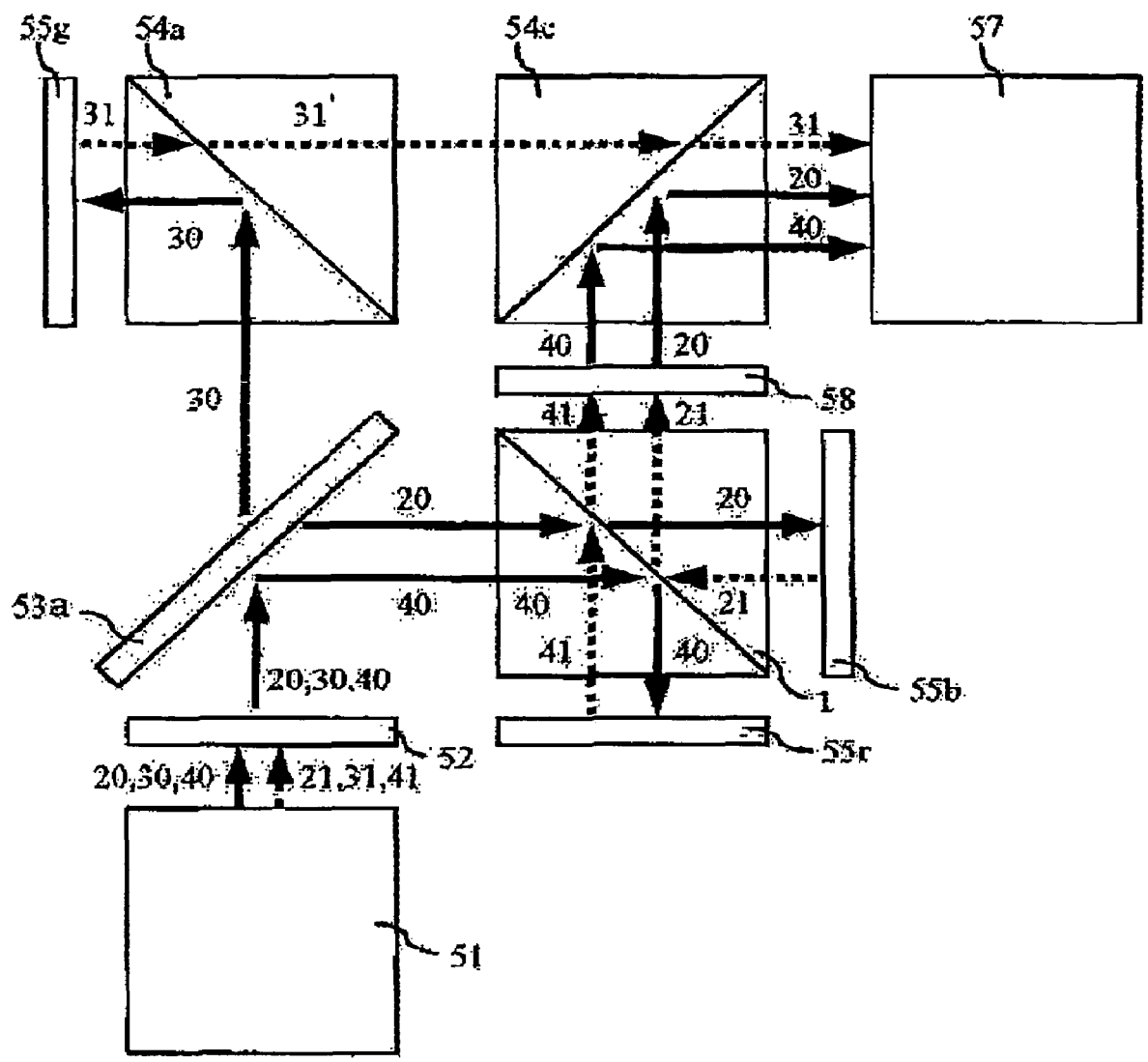
FIG. 15 shows an image projection apparatus which employs the wavelength selective polarizing beam splitter and a reflection type light modulator realized with liquid crystal in the tenth embodiment.

FIG. 15 is a schematic diagram of a projection apparatus of a tenth embodiment of the present invention. FIG. 15 shows the structure in which the wavelength selective polarizing beam splitter of the first, seventh and eighth embodiment is used as a color separation/combination means, a plurality of reflection type liquid crystal display devices 55b, 55g, and 55r are used to modulate polarization directions in accordance with a plurality of signals, and a projection optical system 57 is used to project images produced by the liquid crystal display devices.

Arrows represent the optical paths of respective light beams for red, green, and blue in white display (image information is for white color).

Solid lines represent s-polarized light, while broken lines represent p-polarized light. White light emit from a light source 51 and are unified into s-polarized light by a polarization changer 52. A dichroic mirror 53a transmits the light beam 30 in the green wavelength band, and reflects the light beam 40 in the red wavelength band and the light beam 20 in the blue wavelength band.

The light beam 30 in the green wavelength band transmitted through the dichroic mirror 53a is reflected by a PBS 54a, incident on a reflection type liquid crystal display device 55g for green, and modulated. For the white display, the modulated light emerges therefrom as p-polarized light 31 which is then transmitted through the PBS 54a and a PBS 54c and is incident on a projection lens system 57 for projection.

The light beam 20 in the blue wavelength band reflected by the dichroic mirror 53a is transmitted through a wavelength selective polarizing beam splitter 1, incident on a reflection type liquid crystal display device 55b for blue, and modulated. For the white display, the modulated light emerges therefrom as p-polarized light 21, so that it is reflected by the wavelength selective polarizing beam splitter 1 and changed into s-polarized light 20 through a half-wave plate 58. It is then reflected by the PBS 54c and is incident on the projection lens system 57 for projection.

The light beam 40 in the red wavelength band reflected by the dichroic mirror 53a is reflected by the wavelength selective polarizing beam splitter 1, incident on a reflection type liquid crystal display device 55r for red, and modulated. For the white display, since the modulated light emerges therefrom as p-polarized light 41, it is transmitted through the wavelength selective polarizing beam splitter 1, changed into s-polarized light 40 through the half-wave plate 58, reflected by the PBS 54c, and incident on the projection lens system 57 for projection.

For black display (image information is for black color), all of the light beams emerge from the reflection type liquid crystal display devices 55r, 55g, or 55b with the same polarization as when they are incident thereon, so that they return toward the light source 51 along the same optical paths through the respective optical members The half-wave plate 58 preferably has no wavelength dependency.

Figure 19:
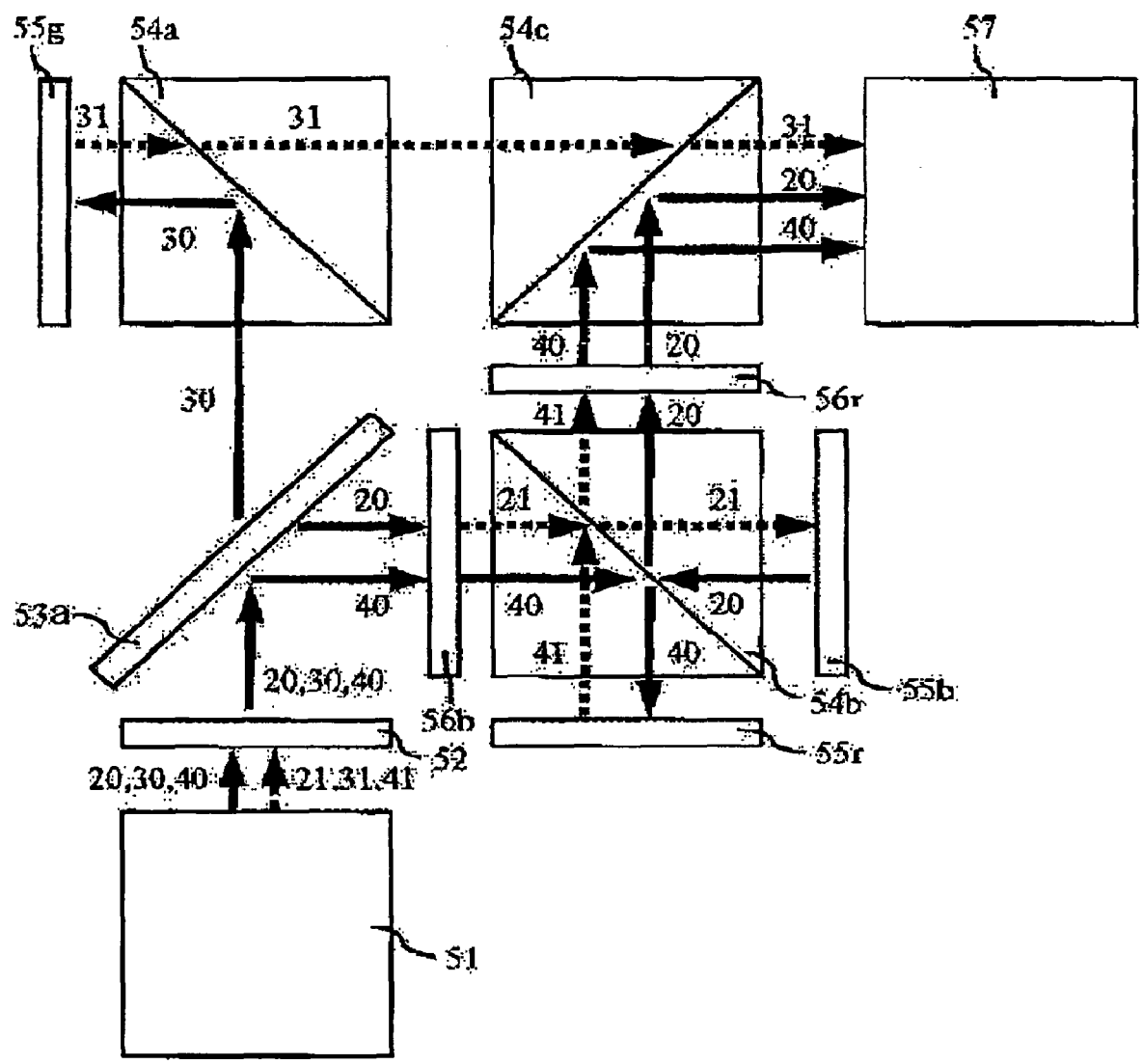
FIG. 19 shows a conventional projection apparatus which employs a reflection type light modulator realized with liquid crystal.

The wavelength selective polarizing beam splitter 1 replaces the PBS54b in the conventional liquid crystal projection optical system which employs the reflection type liquid crystal display device in FIG. 19 to eliminate the need to use the two wavelength selective phase shifters 56b and 56r. Therefore, the composition is simplified, and the composition of the color separation/combination means to achieve the improvement of reliability and durability becomes possible.

The projector shown in FIG. 15 is merely exemplary, and the SPS is applicable to a projector that has a different optical element, a different color-separating wave range, a different light direction etc. The light from the light source has an angular characteristic.

The SPS in the seventh and eighth embodiments having a good angular characteristic reduces the leakage of the light, and thus is effective to the improvements of the light intensity and the contrast. Each prism in the color separation/synthesis means preferably utilizes a material having a low photoelastic coefficient. This is because a large photoelastic coefficient would cause the birefringence due to the stress generated during fixture of the prisms, and change the polarization state. Therefore, a low photoelastic coefficient material is preferred like OHARA Co.'s trade name PBH56 with a photoelastic coefficient of $0.09 \times 10^{-8}$ cm$^{-2}$/N in the seventh and eighth embodiments.

Eleventh Embodiment

Figure 16:
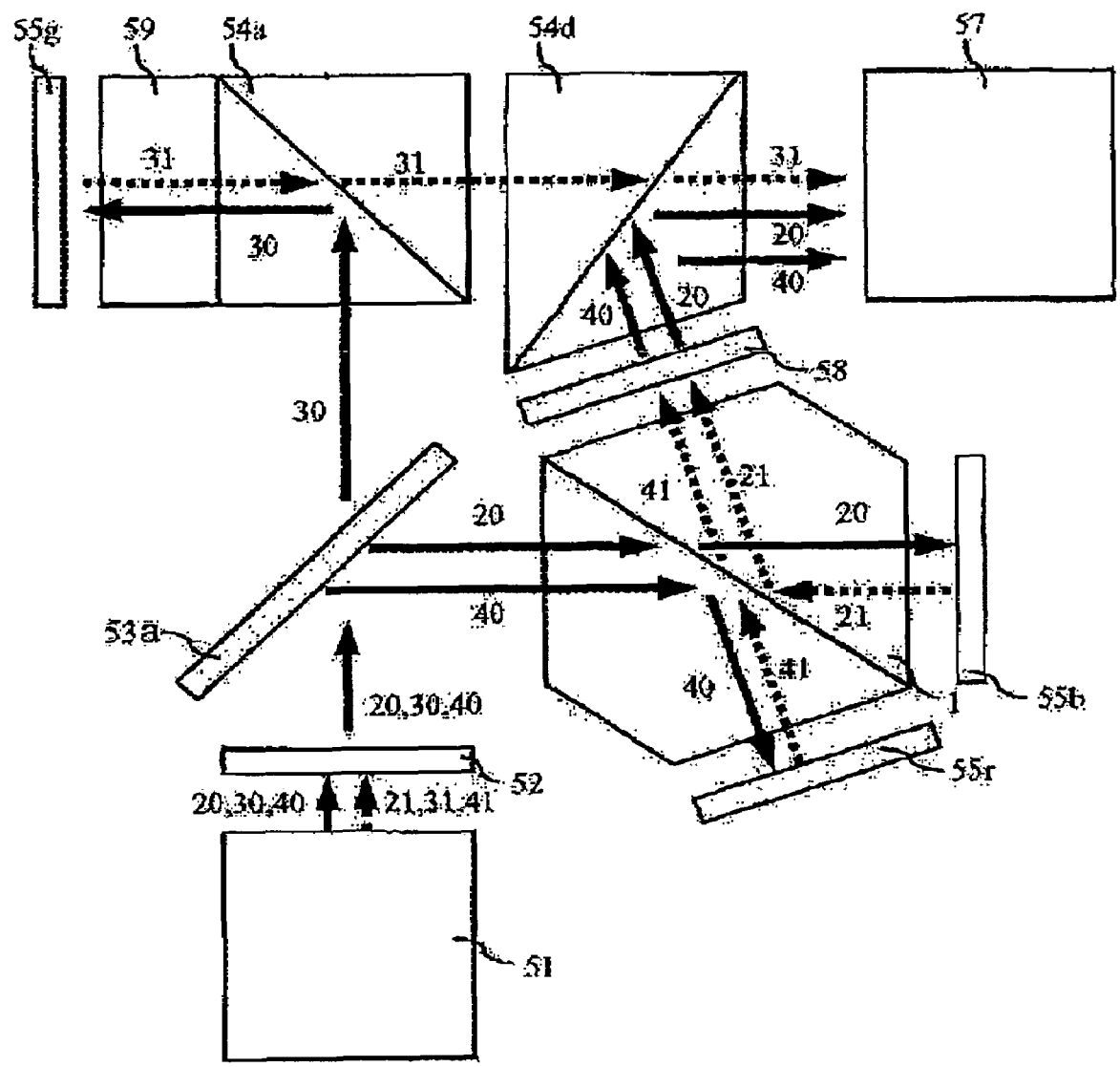
FIG. 16 shows an image projection apparatus which employs the wavelength selective polarizing beam splitter and a reflection type light modulator realized with liquid crystal in the eleventh embodiment.

FIG. 16 is a schematic view of principal part of a projector according to an eleventh embodiment of the present invention. The eleventh embodiment uses a selective polarization splitter that has an incident angle greater than 45° so as to transmit the s-polarized light and reflect p-polarized light in the blue wave range and reflect the s-polarized light and transmit the p-polarized light in the red wave range.

The projection optical system 57 projects an image based on liquid crystal, utilizing the reflective, liquid-crystal light modulator elements 55b, 55g, and 55t.

When the incident angle is greater than 45°, the SPS of this embodiment sandwiches the multilayer structure between two isosceles trapezoids instead of sandwiching the multilayer structure between two triangle pole prism 11a and 11b, and angles between the incident surface 110a and the exit surfaces 111a and 121a are not orthogonal.

Therefore, the lights in the blue and red wave ranges enter the color synthesizing PBS 54d at small incident angles, and require a matching PBS design. The design of the PBS 54d is easy when using the well-known PBS design. In addition, a correcting optical element 59 is provided on the optical path of the green wave range in order to correct the optical path length between the green wave range and the blue and red wave ranges.

The optical system shown in FIG. 16 is thus formed. The color-separated light of each wave range has the same optical path as that in FIG. 10. Therefore, use of the SPS 1 of a high incident angle is applicable to the projector, eliminates the need of using two selective phasers, and provides a reliable and durable liquid crystal projector with a simple structure.

The projector shown in FIG. 16 is merely exemplary, and the SPS is applicable to a projector that has a different optical element, a different color-separating wave range, a different light direction etc. The light from the light source has an angular characteristic. The SPS having a good angular characteristic reduces the leakage of the light, and thus is effective to the improvements of the light intensity and the contrast.

Each prism in the color separation/synthesis means preferably utilizes a material having a low photoelastic coefficient. This is because a large photoelastic coefficient would cause the birefringence due to the stress generated during fixture of the prisms, and change the polarization state.

Therefore, a low photoelastic coefficient material is preferred like OHARA Co.'s trade name PBH56 with a photoelastic coefficient of $0.09 \times 10^{-6}$ cm$^{-2}$/N in the ninth embodiment.

Twelfth Embodiment

Figure 17:
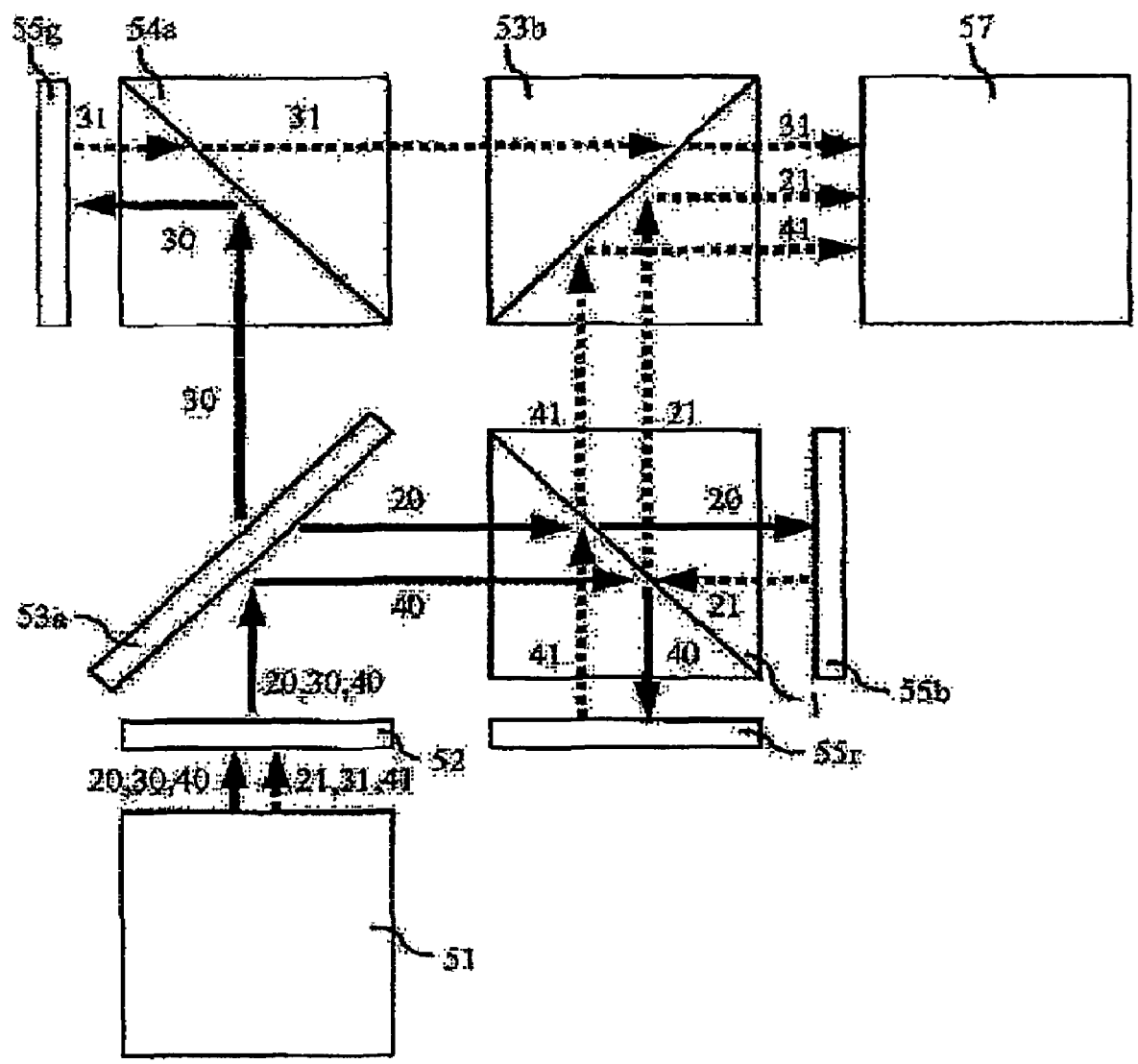
FIG. 17 shows an image projection apparatus which employs the wavelength selective polarizing beam splitter and a reflection type light modulator realized with liquid crystal in the twelfth embodiment.

FIG. 17 is a schematic diagram of a projection apparatus of a twelfth embodiment of the present invention. The twelfth embodiment is the projection apparatus which employs the wavelength selective polarizing beam splitter in any of the first to ninth embodiments and a reflection type liquid crystal display device, similarly to the tenth and eleventh embodiments. FIG. 17, arrows represent the optical paths of respective light beams for red, green, and blue in white display.

Solid lines represent s-polarized light, while broken lines represent p-polarized light. White light 20, 30, and 40 emit from a light source 51 and are unified into s-polarized light by a polarization changer 52. A dichroic mirror 53a transmits the light beam 30 in the green wavelength band, and reflects the light beam 40 in the red wavelength band and the light beam 20 in the blue wavelength band. The light beam 30 transmitted through the dichroic mirror 53a is reflected by a PBS 54a, incident on a reflection type liquid crystal display device 55g realized with liquid crystal for green, and modulated.

For the white display, the modulated light emerges therefrom as p-polarized light 31 which is then transmitted through the PBS 54a and a dichroic prism 53b, and incident on a projection lens system 57 for projection. The dichroic prism 53b is a device formed of prisms sandwiching a multilayer film which transmits p-polarized light in the green wavelength band and reflects p-polarized light in the blue and red wavelength bands.

The light beam 20 in the blue wavelength band reflected by the dichroic mirror 53a is transmitted through a wavelength selective polarizing beam splitter 1, incident on a reflection type liquid crystal display device 55b for blue, and modulated. For the white display, the modulated light emerges therefrom as p-polarized light 21, so that it is reflected by the wavelength selective polarizing beam splitter 1, reflected by the dichroic prism 53b, and incident on the projection lens system 57 for projection. The light beam 40 in the red wavelength band reflected by the dichroic mirror 53a is reflected by the wavelength selective polarizing beam splitter 1, incident on a reflection type liquid crystal display device 55r for red, and modulated. For the white display, since the modulated light emerges therefrom as p-polarized light 41, it is transmitted through the wavelength selective polarizing beam splitter 1, reflected by the dichroic prism 53b, and incident on the projection lens system 57 for projection. For black display, all of the light beams emerge from the reflection type liquid crystal display devices 55r, 55g, or 55b with the same polarization as when they are incident thereon, so that they return toward the light source 51 along the same optical paths through the respective optical members.

Since the twelfth embodiment does not employ a half-wave plate, the transmittance is increased as a whole and the amount of light is increased. The wavelength selective polarizing beam splitter 1 replaces the PBS 54b in the conventional projection apparatus which employs the reflection type liquid crystal display device in FIG. 19 to eliminate the need to use the two wavelength selective phase shifters 56b and 56r. Since the wavelength selective polarizing beam splitter in each of the first to ninth embodiments is formed with a dielectric thin film which can be fabricated through vacuum deposition or the like, the problems associated with the wavelength selective polarizing beam splitter are improved, and it is possible to realize a color separation/combination means which achieves enhanced reliability and durability as well as high surface accuracy in a simplified structure.

In addition, the elimination of wavelength selective phase shifters can increase the transmittance as a whole and the amount of projected light.

The color separation/combination means shown in FIG. 17 is merely exemplary, and the SPS is applicable to a projector that has a different optical element, a different color-separating wave range, a different light direction etc. When the wavelength selective polarizing beam splitter that has the incident angle that is larger than 45° like the eleventh embodiment, it is possible to compose similarly.

Especially, a specific polarized light is intercepted by installing a polarizer between each element, a leak light amount from each element can be decreased, thus is effective to the improvements of the contrast. Each prism in the color separation/synthesis means preferably utilizes a material having a low photoelastic coefficient. This is because a large photoelastic coefficient would cause the birefringence due to the stress generated during fixture of the prisms, and change the polarization state. Therefore, a low photoelastic coefficient material is preferred like OHARA Co.'s trade name PBH56 with a photoelastic coefficient of $0.09 \times 10^{-8}$ cm$^{-2}$/N in the seventh and eighth embodiments.

Thirteenth Embodiment

FIG. 18 is a schematic view of principal part of a projector according to a thirteenth embodiment of the present invention.

The thirteenth embodiment further improves the contrast of the projector of the twelfth embodiment, thereby reducing the flare.

The thirteenth embodiment is different from the twelfth embodiment in that the thirteenth embodiment arranges a polarizer 62 for blocking the s-polarized light both between the PBS 54a and the dichroic prism 53b, and between the selective polarization splitter ("SPS") 1 and the dichroic prism 53b, and a ¼ wave plate 63 between the dichroic prism 53b and the projection lens system 57.

The polarizer 62 blocks the light leakage between the PBS 54a and the SPS 1, and improves the contrast. In particular, in blacking an image, it blocks the leakages, from the PBS 54a and the SPS 1, of the s-polarized light reflected from the SPS due to each liquid crystal. Each lens in the projection lens 57 exhibits slight reflections although the reflections depend upon its anti-reflection coating, and the reflected light returns as the return light to the color separation/synthesis means.

Figure 18A:
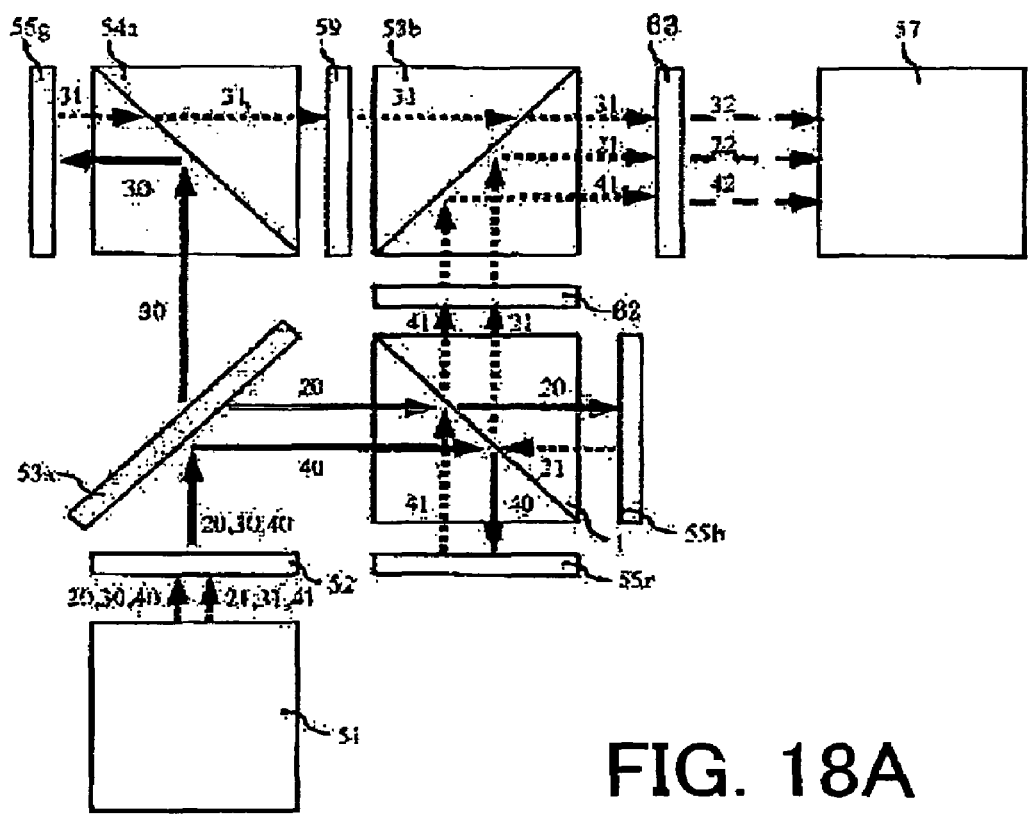
FIG. 18 shows an image projection apparatus which employs the wavelength selective polarizing beam splitter and a reflection type light modulator realized with liquid crystal in thirteenth embodiment.
Figure 18B:
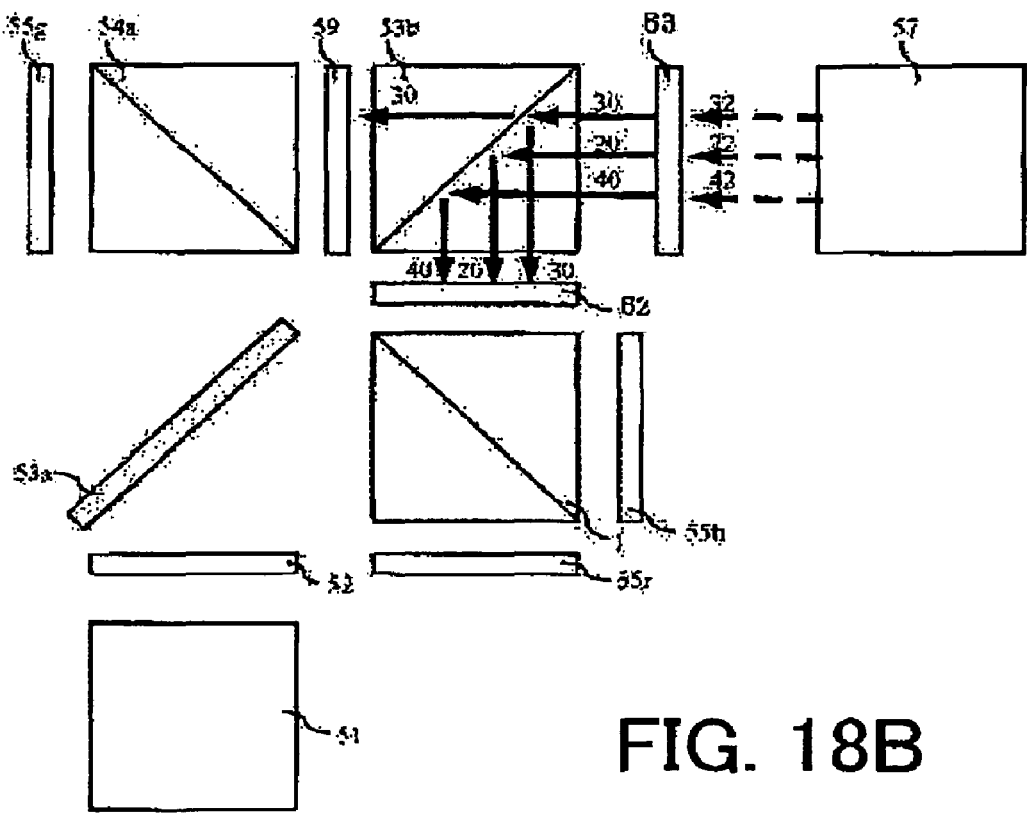

The conventional color separation/synthesis means in FIG. 19 returns to the light modulator element in the liquid crystal, and causes the flare. On the other hand, in this embodiment, as shown in FIG. 18A, the light exited from the ¼ wave plate 63 becomes circularly polarized lights 22, 32 and 42 in the blue, green and red wave ranges, and these lights enter the projection lens 57 so as to be projected. As shown in FIG. 18B, the return lights 22, 32 and 42 from the projection lens 57 transmit the ¼ wave plate 63 and become the s-polarized lights 20, 30 and 40. The dichroic prism 53b transmits, reflects and separates the light, and the polarizer 61 blocks any transmitting and reflected lights.

As discussed, the return light does not reach the color modulator element, and contributes to the flare reduction. The color separation/synthesis means shown in FIGS. 18A and 18B is merely exemplary, and the SPS is applicable, in addition to the configuration shown in FIGS. 18A and 18B, to a projector that has a different optical element, a different color-separating wave range, a different light direction etc. The SPS having an incident angle greater than 45°, as shown in FIG. 11, is also feasible. Each prism in the color separation/synthesis means preferably utilizes a material having a low photoelastic coefficient. This is because a large photoelastic coefficient would cause the birefringence due to the thermal stress generated during fixture of the prisms, and change the polarization state. Therefore, a low photoelastic coefficient material is preferred like OHARA Co.'s trade name PBH56 with a photoelastic coefficient of $0.09 \times 10^{-8}$ cm$^{-2}$/N.

The projector of each embodiment thus includes a light source means, a polarization conversion means that aligns polarization directions of non-polarized lights, a means for separating and synthesizing colors in the wave ranges, and an optical means having both the color separating and synthesizing functions to the light using one polarization splitter of one of the first to ninth embodiments, a color modulation means for modulating the polarization direction, and the projection means for projecting the synthesized light.

Thus, each of the above embodiments selects the optical element and multilayer film material that enable the incident angle to be greater than the Brewster angle for the multilayer film structure provided between the optical elements. In addition, the designed multilayer film structure transmits the first wave range and reflects the second wave range different from the first wave range with respect to the s-polarized light, and reflects the first wave range and transmits the second wave range with respect to the p-polarized light. This realizes the SPS, and the image projecting apparatus that uses the SPS has the smaller number of components, and includes an inexpensive, reliable and durable color separation/synthesis system that utilizes a reflection modulator element.

While each of the above embodiments may provide a layer having small or no optical operation among the H layer, M layer, and L layer.

For example, the inserted layer may meet nd≦2 nm where n is a refractive index and d is a thickness. The projector (or image display unit) of each of the tenth to thirteenth embodiments includes plural reflection liquid crystal display ("LCD") devices (or reflection liquid crystal panels), and an optical system that illuminates the plural reflection LCD devices with plural corresponding colored lights, synthesizes the plural colored lights from the plural reflection LCD device, and projects the synthesized light. The optical system uses the polarization splitter of one of the first to ninth embodiments to separate the colors of the light from the light source and/or to synthesize the colored lights from the reflection LCD device. The optical axis of the optical system forms an about 45° (in a range from 44° to 46°) relative to the multilayer film in the polarization splitter (or the multilayer film structured surface). The incident angle range of the light upon the multilayer film in the polarization splitter is within 10° (or the light is incident upon the multilayer film structure at an angular range between 40' and 50°).

TABLE 1

| | | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
|---|---|---|---|---|---|---|---|---|---|---|
| PRISM | | S-LAH79 | S-LAH79 | S-LAH79 | S-LAH79 | S-LAH79 | S-BSM14 | S-PBM56 | S-PBM56 | S-PBM56 |
| H LAYER | | TiO$_2$ | TiO$_2$ | TiO$_2$ | Tc$_2$O$_3$ | TiO$_2$ | TiO$_2$ | TiO$_2$ | TiO$_2$ | TiO$_2$ |
| L LAYER | | MgF$_2$ | MgF$_2$ | SiO$_7$ | MgF$_2$ | MgF$_2$ | MgF$_2$ | n = 1.15 MEDIUM | Air | MgF$_2$ |
| INCIDENT ANGLE | | 45° | 45° | 45° | 45° | 45° | 0° | 45 ± 2.5° | 45 ± 2.5° | 10 ± 2.5° |
| FIRST WAVE-LENGTH BAND | | BLUE | RED | RED | BLUE | GREEN | RED | BLUE | BLUE | BLUE |
| SECOND WAVE-LENGTH BAND | | RED | BLUE | BLUE | YELLOW | MAGENTA | CYANOGEN | RED | RED | RED |
| 1 | L | 70.49 | 111.73 | 143.71 | 33.07 | 62.35 | 86.03 | 11.55 | 25.71 | 28.2 |
| 2 | H | 25.6 | 40.5 | 26.6 | 169.4 | 54.7 | 43.94 | 23.32 | 17.3 | 36.5 |
| 3 | L | 112.9 | 146.88 | 173.18 | 42.39 | 40.74 | 56.02 | 29.64 | 38.31 | 53.59 |
| 4 | H | 36.59 | 99.99 | 54.57 | 32.15 | 91.66 | 100.51 | 50.22 | 11.67 | 60.33 |
| 5 | L | 71.27 | 86.47 | 204.36 | 29.2 | 48.79 | 134.43 | 18.42 | 45.48 | 41.31 |
| 6 | H | 37.33 | 38.17 | 28.82 | 57.58 | 75.3 | 35.79 | 56.14 | 17.08 | 50.71 |
| 7 | L | 79.02 | 265.75 | 171.15 | 110.34 | 42.62 | 135.33 | 49.01 | 55.84 | 78.03 |
| 8 | H | 133.93 | 31.1 | 55.71 | 28.73 | 55.5 | 109.68 | 38.02 | 23.92 | 39.34 |
| 9 | L | 134.01 | 101.07 | 244.44 | 194.6 | 62.74 | 153.83 | 34.29 | 43.53 | 70.54 |
| 10 | H | 15.91 | 116.84 | 31.59 | 50.73 | 32.36 | 30.4 | 83.28 | 19.15 | 58.15 |
| 11 | L | 99.26 | 166.98 | 145.8 | 103.83 | 19.11 | 203.72 | 40.19 | 54.29 | 38.02 |
| 12 | H | 13.67 | 18.13 | 49.09 | 29.74 | 87.61 | 117.52 | 35.46 | 6.61 | 50.45 |
| 13 | L | 70.91 | 58.22 | 280.1 | 290.33 | 67.35 | 167.04 | 51.82 | 54.55 | 77.75 |
| 14 | H | 53.72 | 20.18 | 38.5 | 16.3 | 50.02 | 26.85 | 83.7 | 21.28 | 34.57 |
| 15 | L | 57 | 143.07 | 138.6 | 197.75 | 74.14 | 238.05 | 27.98 | 18.47 | 74.44 |
| 16 | H | 30.91 | 116.12 | 37.68 | 26.49 | 76.69 | 102.28 | 36.71 | 17.34 | 46.34 |
| 17 | L | 96.13 | 154.46 | 281.27 | 149.33 | 57.68 | 91.11 | 69.16 | 20.59 | 31.6 |
| 18 | H | 46.27 | 38.3 | 49.94 | 30.04 | 135.7 | 27.45 | 53.97 | 9.96 | 62.58 |
| 19 | L | 52.52 | 201.98 | 156.64 | 351.98 | 64.79 | 345 | 15.09 | 22.28 | 62.16 |
| 20 | H | 33.18 | 228.41 | 29.13 | 17.4 | 35.57 | 27.09 | 61.49 | 12.57 | 38.89 |
| 21 | L | 189.12 | 76.36 | 237.52 | 113.14 | 96.17 | 113.88 | 69.17 | 77.47 | 72.5 |
| 22 | H | 17.74 | 14.03 | 58.46 | 18.12 | 197.46 | 107 | 32.57 | 40.79 | 65.34 |
| 23 | L | 151 | 127.81 | 190.05 | 89.35 | 40.29 | 197.76 | 38.04 | 34.33 | 20.96 |
| 24 | H | 139.44 | 32.06 | 25.92 | 65.08 | 49.36 | 33.05 | 83.91 | 47 | 54.83 |
| 25 | L | 56.77 | 281.24 | 188.31 | 174.23 | 151.84 | 154.28 | 52.45 | 44.93 | 70.57 |
| 26 | H | 45.26 | 36.79 | 59.08 | 29.18 | 54.89 | 226.85 | 29.57 | 5.96 | 43.5 |
| 27 | L | 77.01 | 143.85 | 219.02 | 134.12 | 44.11 | 16.73 | 80.28 | 64.79 | 43.31 |
| 28 | H | 29.55 | 217.98 | 27.44 | 50.82 | 84.04 | 52.47 | 48.77 | 43.54 | 75.8 |
| 29 | L | 131.51 | 74.42 | 155.88 | 130.69 | 68.47 | 37.93 | 24.25 | 32.30 | 35.39 |
| 30 | H | 24.61 | 50.29 | 55.51 | 31.65 | 126.38 | 198.92 | 48.48 | 55.66 | 36.67 |
| 31 | L | 66.93 | 56.78 | 246.55 | 98.85 | 54.12 | 36.63 | 54.82 | 62.39 | 65.08 |
| 32 | H | (nm) | (nm) | 31.57 | (nm) | 58.52 | 57.27 | 17.72 | 7.73 | 37.99 |
| 33 | L | | | 139.96 | | 63.72 | 121.42 | 68.61 | 52.21 | 41.73 |
| 34 | H | | | 45.91 | | 65.83 | 41.28 | 27.2 | 47.5 | 84.24 |
| 35 | L | | | 279.17 | | 98.86 | 107.42 | 54.7 | 30.16 | 31.36 |
| 36 | H | | | 39.4 | | 95.01 | (nm) | 62.09 | 50.03 | 33.24 |
| 37 | L | | | 137.05 | | 32.96 | | 51.82 | 74.15 | 35.83 |
| 38 | H | | | 36.53 | | 57.47 | | 32.35 | 11.63 | 33.39 |
| 39 | L | | | 281.56 | | 106.23 | | 98.43 | 48.58 | 37.12 |
| 40 | H | | | 50.2 | | 75.03 | | 38.81 | 57.1 | 78.43 |
| 41 | L | | | 149.47 | | 86.09 | | 43.44 | 41.1 | 39.17 |
| 42 | H | | | 29.99 | | 55.37 | | 57.76 | 20.12 | 44.3 |
| 43 | L | | | 247.25 | | 85.31 | | 58.96 | 88.89 | 72.48 |
| 44 | H | | | 58.75 | | 41.89 | | 35.82 | 41.02 | 46.02 |
| 45 | L | | | 174.88 | | 3.38 | | 51.5 | 40.78 | 40.74 |
| 46 | H | | | 27.99 | | 66.39 | | 64.81 | 31.52 | 66.51 |
| 47 | L | | | 209.54 | | 15.01 | | 12.44 | 81.45 | 45.41 |
| 48 | H | | | 55.21 | | 122.02 | | 44.33 | 19.88 | 38.82 |
| 49 | L | | | 181.24 | | 56.35 | | 8.16 | 36.89 | 33.46 |
| 50 | H | | | 27.82 | | 45.56 | | (nm) | 18.33 | (run) |
| 51 | L | | | 142.61 (nm) | | 67.14 (nm) | | | (nm) | |

This embodiment provides a SPS that transmits the s-polarized light and reflects the p-polarized light in the first wave range, and reflects the p-polarized light and reflects the s-polarized light in the second wave range.

In addition, this embodiment applies the SPS to the color separation/synthesis means in the projector (or the color separation/synthesis optical system), and provides a high-contrast, reliable and durable projector having a simple structure.

This application claims a foreign priority benefit based on Japanese Patent Application No. 2004-232125, filed on Aug. 9, 2004, which is hereby incorporated by reference herein in its entirety as if fully set forth herein.

What is claimed is:

1. A polarizing beam splitter comprising:
a multilayer film formed by alternately laminating a plurality of H layers and a plurality of L layers having a relatively lower refractive index than a refractive index of the H layers;
an incident-side optical member which is disposed on one side of the multilayer film; and
an emergence-side optical member which is disposed on another side of the multilayer film,
wherein transmittance of s-polarized light is higher than that of p-polarized light by 60% or higher of the transmittance of the p-polarized light in a first wavelength band having a bandwidth equal to or larger than 30 nm in a visible region, and transmittance of p-polarized light is higher than that of s-polarized light by 60% or higher of the transmittance of the s-polarized light in a second wavelength band different from the first wavelength band in the visible region.

2. The polarizing beam splitter according to claim 1, wherein a light beam incident on the multilayer structure has an incident angle $\theta_o$, which satisfies:

$$\theta_o > \tan^{-1}\left(\frac{n_L}{n_p}\right)$$

where $n_p$ represents a refractive index of the incident-side optical member and $n_L$ represents the refractive index of the L layer.

3. The polarizing beam splitter according to claim 1, wherein a light beam incident on the multilayer structure has an incident angle $\theta_o$, which satisfies:

$$\theta_o > \sin^{-1}\left(\frac{n_L}{n_P}\right)$$

where $n_p$ represents a refractive index of the incident-side optical member and $n_L$ represents the refractive index of the L layer.

4. The polarizing beam splitter according to claim 1, wherein the first wavelength band and the second wavelength band generally match one or two of three bands, that is, a red wavelength band, a green wavelength band, and a blue wavelength band.

5. The polarizing beam splitter according to claim 1, wherein the following is satisfied:

$$1.4 \leq n_p \leq 2.1$$

where $n_p$ represents a refractive index of a material of the optical member in a visible light wavelength band.

6. The polarizing beam splitter according to claim 1, wherein the following are satisfied;

$$n_L \leq n_H$$

$$1.6 \leq n_H \leq 2.6$$

$$1.0 \leq n_L \leq 1.7$$

where $n_H$ represents the refractive index of a material of the H layer and $n_L$ represents the refractive index of a material of the L layer in a visible light wavelength band.

7. The polarizing beam splitter according to claim 6, wherein both of the H layer and the L layer are thin films.

8. The polarizing beam splitter according to claim 7, wherein the thin film of the H layer is made of a material including $TiO_2$, $CeO_2$, $Nd_2O_3$, $ZnO$, $Ta_2O_5$, $HfO_2$, $Nb_2O_5$, $ZrO_2$, $ZnS$, $Al_2O_3$, or a mixture containing any one of them.

9. The polarizing beam splitter according to claim 7, wherein the thin film of the L layer is made of a material including $SiO_2$, $MgF_2$, $AlF_3$, $Na_3AlF_6$, $CaF_2$, $LiF$, $NaF$, $Al_2O_3$, or a mixture containing any one of them.

10. The polarizing beam splitter according to claim 1, wherein the polarizing beam splitter achieves excellent polarization splitting in a range of incident angles of a light beam incident on the multilayer structure smaller than 10 degrees.

11. The polarizing beam splitter according to claim 1, wherein the polarizing beam splitter achieves excellent polarization splitting in a range of incident angles of a light beam incident on the multilayer structure smaller than 5 degrees.

12. The polarizing beam splitter according to claim 1, wherein the L layer is air.

13. The polarizing beam splitter according to claim 1, wherein the L layer is a nanoporous material.

14. A projection apparatus comprising:
light source means;
a polarization changer which unifies non-polarized light into one polarization direction;
a dichroic mirror which splits light into reflected light and transmitted light depending on a wavelength band;
a polarizing beam splitter which splits light into reflected light and transmitted light depending on a polarization state; the polarizing beam splitter according to claim 1;
a light modulator which modulates a polarization direction in accordance with a signal;
a dichroic prism which combines light modulated by the light modulator; and
a projection lens which projects the combined light.

15. A projection apparatus comprising:
light source means;
a polarization changer which unifies non-polarized light into one polarization direction;
a dichroic mirror which splits light into reflected light and transmitted light depending on a wavelength band;
a polarizing beam splitter which splits light into reflected light and transmitted light depending on a polarization state; the polarizing beam splitter according to claim 1;
a light modulator which modulates a polarization direction in accordance with a signal;
a dichroic prism which combines light modulated by the light modulator; and
a polarizer which blocks leaked light and/or return light toward the light source means;
a quarter-wave plate which rotates linearly polarized light to circularly polarized light; and
a projection lens which projects the combined light.

16. An image display apparatus comprising:
a plurality of reflection type liquid crystal display devices;
an optical system which illuminates the plurality of reflection type liquid crystal display devices with a plurality of light beams for colors associated with the respective display devices, and combines and projects the plurality of light beams for colors from the plurality of reflection type liquid crystal display devices, wherein the optical system uses the polarizing beam splitter to combine the plurality of light beams for colors from the plurality of reflection type liquid crystal display devices, the polarizing beam splitter comprising a multilayer film formed by alternately laminating a plurality of H layers and a plurality of L layers having a relatively lower refractive index than a refractive index of the H layers, and wherein transmittance of s-polarized light is higher than that of p-polarized light by 60% or higher of the transmittance of the p-polarized light in a first wavelength band having a bandwidth equal to or larger than 30 nm in a visible region, and transmittance of p-polarized light is higher than that of s-polarized light by 60% or higher of the transmittance of the s-polarized light in a second wavelength band different from the first wavelength band in the visible region.

17. A projection apparatus comprising:

light source means;

a polarization changer which unifies non-polarized light into one polarization direction;

a dichroic mirror which splits light into reflected light and transmitted light depending on a wavelength band;

a polarizing beam splitter which splits light into reflected light and transmitted light depending on a polarization state, the polarizing beam splitter comprising a multilayer film formed by alternately laminating a plurality of H layers and a plurality of L layers having a relatively lower refractive index than a refractive index of the H layers;

a light modulator which modulates a polarization direction in accordance with a signal;

a half-wave plate which rotates a polarization direction 90 degrees; a polarizing beam splitter which combines light modulated by the light modulator; and a projection lens which projects the combined light, wherein transmittance of s-polarized light is higher than that of p-polarized light by 60% or higher of the transmittance of the p-polarized light in a first wavelength band having a bandwidth equal to or larger than 30 nm in a visible region, and transmittance of p-polarized light is higher than that of s-polarized light by 60% or higher of the transmittance of the s-polarized light in a second wavelength band different from the first wavelength band in the visible region.

* * * * *